United States Patent
Zhang et al.

(10) Patent No.: US 12,049,203 B2
(45) Date of Patent: Jul. 30, 2024

(54) BATTERY SWAPPING CONTROL METHOD AND SYSTEM, ELECTRONIC DEVICE, AND COMPUTER READABLE STORAGE MEDIUM

(71) Applicants: AULTON NEW ENERGY AUTOMOTIVE TECHNOLOGY GROUP, Guangdong (CN); SHANGHAI DIANBA NEW ENERGY TECHNOLOGY CO., LTD., Shanghai (CN)

(72) Inventors: Jianping Zhang, Guangdong (CN); Zhimin Chen, Guangdong (CN); Wencheng Lu, Guangdong (CN)

(73) Assignees: AULTON NEW ENERGY AUTOMOTIVE TECHNOLOGY GROUP, Guangzhou (CN); SHANGHAI DIANBA NEW ENERGY TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/033,184

(22) PCT Filed: Oct. 26, 2021

(86) PCT No.: PCT/CN2021/126454
§ 371 (c)(1),
(2) Date: Oct. 16, 2023

(87) PCT Pub. No.: WO2022/089436
PCT Pub. Date: May 5, 2022

(65) Prior Publication Data
US 2024/0083394 A1   Mar. 14, 2024

(30) Foreign Application Priority Data
Oct. 26, 2020   (CN) .......................... 202011157196.7

(51) Int. Cl.
*B60L 53/80* (2019.01)
*B60S 5/06* (2019.01)
*B66F 9/06* (2006.01)

(52) U.S. Cl.
CPC ................. *B60S 5/06* (2013.01); *B60L 53/80* (2019.02); *B66F 9/06* (2013.01); *Y02T 10/70* (2013.01); *Y02T 10/7072* (2013.01)

(58) Field of Classification Search
CPC .... B60S 5/06; B60L 53/80; B66F 9/06; Y02T 10/70; Y02T 10/7072
See application file for complete search history.

(56) References Cited

U.S. PATENT DOCUMENTS

| 4,428,708 A | 1/1984 | Burt |
| 2018/0154789 A1 | 6/2018 | Janku |

(Continued)

FOREIGN PATENT DOCUMENTS

| CN | 106740725 A | * | 5/2017 | .............. B60L 53/80 |
| CN | 208101947 U | * | 11/2018 | .............. B60L 53/36 |

(Continued)

OTHER PUBLICATIONS

Jan. 19, 2022 International Search Report issued in International Patent Application No. PCT/CN2021/126454.

(Continued)

*Primary Examiner* — Thomas Randazzo

(57) ABSTRACT

Provided are a battery swapping control method and system, an electronic device, and a computer readable storage medium, the battery swapping control method being used for a battery swapping device (2) to remove a battery pack from the bottom of an electric car (9), the battery swapping device (2) having a liftable battery swapping platform, and the battery swapping control method comprising: controlling the battery swapping device (2) to move to a preset (Continued)

battery swapping position beneath the electric car (9); controlling the battery swapping platform to rise to a preset removal height; and controlling the battery swapping device (2) to remove the battery pack from the bottom of the electric car (9), thereby the entire procedure of the battery swapping process is controlled, increasing battery swapping efficiency and reducing the safety hazards in the battery swapping process.

29 Claims, 17 Drawing Sheets

(56) References Cited

U.S. PATENT DOCUMENTS

| | | | | |
|---|---|---|---|---|
| 2020/0148073 | A1 | 5/2020 | Sasu | |
| 2020/0385252 | A1* | 12/2020 | Zhang | B66F 9/065 |
| 2021/0261017 | A1* | 8/2021 | Uiterloo | H01M 50/249 |

FOREIGN PATENT DOCUMENTS

| | | | | |
|---|---|---|---|---|
| CN | 208101947 | U | 11/2018 | |
| CN | 209290364 | A | 8/2019 | |
| CN | 108128132 | A | 6/2020 | |
| CN | 111231736 | A | 6/2020 | |
| CN | 111231741 | A | 6/2020 | |
| CN | 111284359 | A * | 6/2020 | B60L 53/80 |
| CN | 111301215 | A * | 6/2020 | B60L 53/80 |
| CN | 111301215 | A | 6/2020 | |
| CN | 111645560 | A | 9/2020 | |
| CN | 111791745 | A | 10/2020 | |
| CN | 111873849 | A | 11/2020 | |
| CN | 113060043 | A | 7/2021 | |
| CN | 113212228 | A | 8/2021 | |
| CN | 114132208 | A * | 3/2022 | B60L 53/80 |
| CN | 114132209 | A * | 3/2022 | B60L 53/80 |
| EP | 3689688 | A1 | 8/2020 | |
| JP | 2012006498 | A | 1/2012 | |
| JP | 2012040935 | A | 3/2012 | |
| JP | 2018518421 | A | 7/2018 | |
| JP | 2018154190 | A | 10/2018 | |
| JP | 2019137144 | A | 8/2019 | |
| WO | WO-2010070642 | A1 * | 6/2010 | B60S 5/06 |
| WO | WO-2016198552 | A1 * | 12/2016 | B60K 1/04 |
| WO | WO-2018121746 | A1 * | 7/2018 | B23P 19/10 |

OTHER PUBLICATIONS

Jan. 19, 2022 Written Opinion of the International Searching Authority issued in International Patent Application No. PCT/CN2021/126454.

Jan. 16, 2022 International Preliminary Examination Report in International Patent Application No. PCT/CN2021/126454.

Jun. 10, 2023 Chinese Office Action issued in Chinese Patent Application No. 202011157196.7.

Jun. 9, 2023 Chinese Search Report issued in Chinese Patent Application No. 202011157196.7.

Oct. 31, 2023 Notice of Reasons for Refusal issued in Japanese Patent Application No. 2023-525081.

Jan. 4, 2024 Korean Office Action issued in Korean Patent Application No. 10-2023-7017941.

Jan. 19, 2024 Chinese Second Office Action issued in Chinese Patent Application No. 202011157196.7.

* cited by examiner

BATTERY SWAPPING CONTROL METHOD AND SYSTEM, ELECTRONIC DEVICE, AND COMPUTER READABLE STORAGE MEDIUM

The present application is a National Stage of International Application No. PCT/CN2021/126454, filed on Oct. 26, 2021, which claims priority of the Chinese Patent Application No. 2020111571967, filed on Oct. 26, 2020, the contents of which are incorporated herein by reference in their entireties.

TECHNICAL FIELD

The present invention relates to the field of battery swapping control, and more particularly to a battery swapping control method and system, an electronic device, and a computer readable storage medium.

BACKGROUND

At present, the emission of automobile exhaust gas is still an important factor in environmental pollution. In order to manage automobile exhaust gas, natural gas automobile, hydrogen fuel automobile, solar energy automobile, and electric car have been developed to replace fuel oil automobiles. The most promising one is the electric car. Currently, electric cars mainly include a direct-charging model and a quick-changing model.

When a battery of a quick-changing electric car is replaced, it is necessary for a battery swapping device to travel to be below the automobile, so as to take down the original battery pack on the automobile from the battery bracket, and then install a new battery pack onto the battery bracket. The low battery swapping efficiency of the existing battery swapping device when taking down the old battery pack or mounting the new battery pack also tends to cause a potential safety hazard, thus resulting in the situation that the battery swapping device cannot accurately and quickly remove or install the battery pack, and even further causing a battery swapping failure.

CONTENT OF THE PRESENT INVENTION

The technical problems to be solved by the present invention is to overcome the defects in the prior art that when a battery is replaced by a battery swapping device, the battery swapping efficiency is low, there is a safety hazard and the result of a battery swapping failure, and to provide a battery swapping control method and system, an electronic device, and a computer-readable storage medium which can improve the battery swapping efficiency and reduce the safety hazards during the battery swapping process.

The present invention solves the above technical problems with the following technical solutions.

The present invention provides a battery swapping control method, wherein the battery swapping control method is applied to a battery swapping device removing a battery pack from a bottom of an electric car, the battery swapping device having a liftable battery swapping platform, and the battery swapping control method comprising:
  controlling the battery swapping device to move to a preset battery swapping position beneath the electric car;
  controlling the battery swapping platform to rise to a preset removal height; and
  controlling the battery swapping device to remove the battery pack from the bottom of the electric car.

Preferably, before the step of controlling the battery swapping device to move to a preset battery swapping position beneath the electric car, the following is included:
  adjusting the height of the battery swapping platform to a first safe height threshold, the first safe height threshold being lower than the height from the lowest part of a chassis of the electric car to a driving plane of the battery swapping device.

Preferably, the battery swapping platform is provided with a distance measuring apparatus, and the battery swapping control method further comprises:
  acquiring a current height of the battery swapping platform through the distance measuring apparatus; and
  judging whether the current height is within the first range of the first safe height threshold, and if not, executing the step of adjusting the height of the battery swapping platform to the first safe height threshold.

Preferably, before the step of controlling the battery swapping device to move to a preset battery swapping position beneath the electric car, the following is included:
  controlling the battery swapping device to move to a first safe telescopic position along the width direction of the electric car so that wheels are located within a preset parking range of a battery swapping site when the electric car moves to the battery swapping site.

Preferably, before the step of controlling the battery swapping device to move to a preset battery swapping position beneath the electric car, the following is included:
  controlling the battery swapping device to move to a second safe telescopic position along a length direction of the electric car so as to avoid front wheels and rear wheels of the electric car when the battery swapping device located at the second safe telescopic position enters the preset battery swapping position along a width direction of the electric car.

Preferably, the battery swapping device comprises an unlocking jacking pin, the battery pack is mounted to a battery bracket, and the battery bracket comprises a locking mechanism on which an unlocking point is provided;
  wherein after a step of controlling the battery swapping device to move to a preset battery swapping position beneath the electric car, the method further comprises:
  adjusting the position of the unlocking jacking pin to align the unlocking jacking pin with the unlocking point.

Preferably, the battery swapping device is provided with an unlocked position and an in situ position, wherein when the unlocking jacking pin is located at the unlocked position, the unlocking jacking pin is aligned with the unlocking point, and when the unlocking jacking pin is located at the in situ position, the unlocking jacking pin avoids the unlocking point;
  the step of adjusting the position of the unlocking jacking pin comprises:
  moving the unlocking jacking pin, and judging whether the unlocking jacking pin is located at the unlocked position, if not, continuing to move the unlocking jacking pin, and if so, stopping moving the unlocking jacking pin.

Preferably, a detection sensor is provided on the battery swapping device, a detection point is provided on the unlocking jacking pin, or the detection point is provided on the battery swapping device, and the detection sensor is provided on the unlocking jacking pin;
  the step of judging whether the unlocking jacking pin is located at the unlocked position comprises:

when the detection point is located in a detection area of the detection sensor, determining that the unlocking jacking pin is located at the unlocked position.

Preferably, the battery swapping platform comprises an insertion piece, the battery pack is mounted to a battery bracket, a preset receiving position is provided on the battery bracket, and after a step of controlling the battery swapping device to move to a preset battery swapping position beneath the electric car, the method further comprises:

adjusting the position of the battery swapping platform along the length direction of the electric car to move the insertion piece to a preset insertion position, the preset insertion position being aligned with the preset receiving position.

Preferably, a receiving piece is provided above the preset receiving position:

the step of controlling the battery swapping platform to rise to a preset removal height comprises:

controlling the battery swapping platform to rise at a first speed to a first removal height, wherein when the battery swapping platform is located at the first removal height, the insertion piece is in contact with the receiving piece;

and controlling the battery swapping platform to rise to a preset removal height at a second speed, wherein when the battery swapping platform is located at the preset removal height, the insertion piece is inserted into the receiving piece and is fitted to the receiving piece;

wherein the first speed is greater than the second speed.

Preferably, a battery bracket comprises a locking mechanism, the locking mechanism comprises a lock tongue, a locking groove, and an unlocking point, the battery pack comprises a lock shaft, and when the battery pack is locked, the lock shaft enters the locking groove through an opening of the locking groove and the lock shaft is fastened in the locking groove through the lock tongue;

a step of controlling the battery swapping device to remove the battery pack from the bottom of the electric car comprises:

controlling the battery swapping platform to move such that the lock shaft of the battery pack moves away from the lock tongue to an unlocking pre-pushing position;

an unlocking jacking pin of the battery swapping device jacking up the unlocking point to drive the lock tongue away from the locking groove; and controlling the battery swapping platform to move such that the lock shaft of the battery pack moves toward an opening of the locking groove to an unlocked position to separate the battery pack from the battery bracket and drop the same into the battery swapping device.

Preferably, after the step of controlling the battery swapping device to remove the battery pack from the bottom of the electric car, the following is included:

adjusting the height of the battery swapping platform to a second safe height threshold, wherein a sum of the second safe height threshold and the height of the battery pack is lower than the height from the lowest part of the chassis of the electric car to a driving plane of the battery swapping device.

Preferably, the battery swapping platform comprises a lifting mechanism, an in-place switch is provided on the lifting mechanism, and the battery swapping control method further comprises:

triggering the in-place switch to stop a descending of the battery swapping platform after the height of the battery swapping platform lowers to the second safe height threshold.

Preferably, after the step of adjusting the height of the battery swapping platform to a second safe height threshold, the following is included:

controlling the battery swapping device to move to a third safe telescopic position along a length direction of the electric car so as to avoid front wheels and rear wheels of the electric car when the battery swapping device moves out from below the electric car along a width direction of the electric car.

Preferably, after the step of adjusting the height of the battery swapping platform to a second safe height threshold, the following is included:

adjusting an unlocking jacking pin of the battery swapping device to an in situ position.

Preferably, the battery swapping control method further includes:

acquiring an identifier of the electric car after the electric car enters a battery swapping station;

matching a model of the electric car according to the identifier; and matching a corresponding battery swapping parameter according to the model of the electric car, wherein the battery swapping parameter comprises at least one of the first safe height threshold, the second safe height threshold, the first safe telescopic position, the second safe telescopic position, and the third safe telescopic position.

The present invention further provides a battery swapping control method, wherein the battery swapping control method is applied to a battery swapping device mounting a battery pack in a battery bracket of an electric car, wherein the battery swapping device has a liftable battery swapping platform, the battery pack to be mounted to the battery bracket of the electric car is placed on the battery swapping device, and the battery swapping control method comprises:

controlling the battery swapping device to move to a preset battery swapping position beneath the electric car;

controlling the battery swapping platform to rise to a preset mounting height; and controlling the battery swapping device to mount the battery pack to the battery bracket of the electric car.

Preferably, before a step of controlling the battery swapping device to move to a preset battery swapping position beneath the electric car, the following is included: adjusting the height of the battery swapping platform to a third safe height threshold, wherein a sum of the third safe height threshold and the height of the battery pack is lower than the height from the lowest part of a chassis of the electric car to a driving plane of the battery swapping device.

Preferably, the battery swapping platform is provided with a distance measuring apparatus, and the battery swapping control method further comprises:

acquiring a current height of the battery swapping platform through the distance measuring apparatus; and judging whether the current height is within a third range of the third safe height threshold, and if not, executing the step of adjusting the height of the battery swapping platform to the third safe height threshold.

Preferably, before the step of controlling the battery swapping device to move to a preset battery swapping position beneath the electric car, the following is included:

controlling the battery swapping device to move to a fourth safe telescopic position along a length direction of the electric so as to avoid front wheels and rear wheels of the electric car when the battery swapping device enters the preset battery swapping position along a width direction of the electric car.

Preferably, before the step of controlling the battery swapping platform to rise to a preset mounting height, the following is included:
adjusting a position of an unlocking jacking pin so that the unlocking jacking pin avoids an unlocking point on a locking mechanism.

Preferably, a receiving piece is provided above the preset receiving position:
a step of controlling the battery swapping platform to rise to a preset mounting height comprises:
controlling the battery swapping platform to rise at a first speed to a first mounting height, wherein the insertion piece is in contact with the battery bracket when the battery swapping platform is located at the first mounting height, and
controlling the battery swapping platform to rise to the preset mounting height at a second speed, wherein when the battery swapping platform is located at the preset mounting height, the insertion piece is inserted into the receiving piece and is fitted to the receiving piece;
wherein the first speed is greater than the second speed.

Preferably, the battery bracket comprises a locking mechanism, the locking mechanism comprises a locking groove provided with an opening facing the ground, the battery pack is provided thereon with a lock shaft, and the locking mechanism further comprises a lock tongue;
the step of controlling the battery swapping device to mount the battery pack to the battery bracket of the electric car comprises:
controlling the battery swapping platform to rise so that the lock shaft enters the opening and pushes open the lock tongue; and
controlling the battery swapping platform to move in a direction away from the lock tongue to a first locked position;
wherein the lock tongue drops to close the opening.

Preferably, after the step of the lock tongue dropping to close the opening, the following is included: controlling the battery swapping platform to move so as to move the lock shaft toward the opening to a fastened position such that the lock shaft abuts against the lock tongue.

Preferably, the step of controlling the battery swapping platform to move away from the lock tongue to the first locked position comprises:
in the process of controlling the battery swapping platform to move away from the lock tongue, collecting a first image comprising the locking mechanism, judging whether the lock shaft is located at the first locked position according to a first standard image of the locking mechanism located at the first locked position, and if so, stopping moving the lock shaft, and if not, continuing to move the lock shaft.

Preferably, the step of controlling the battery swapping platform to move so as to move the lock shaft toward the opening to a fastened position comprises:
in the process of controlling the battery swapping platform to move so as to move the lock shaft to the opening, collecting a second image comprising the locking mechanism, and judging whether the lock shaft is located at the fastened position according to a second standard image of the locking mechanism located at the fastened position, and if so, stopping moving the lock shaft, and if not, continuing to move the lock shaft.

Preferably, after the step of controlling the battery swapping device to mount the battery pack to the battery bracket of the electric car, the following is included:
adjusting the height of the battery swapping platform to a fourth safe height, wherein the fourth safe height is lower than the height from the lowest part of the chassis of the electric car to the driving plane of the battery swapping device.

Preferably, the battery swapping control method further includes:
acquiring an identifier of the electric car after the electric car enters a battery swapping station;
matching a model of the electric car according to the identifier; and
matching a corresponding battery swapping parameter according to the model of the electric car, wherein the battery swapping parameter comprises at least one of the third safe height threshold, the fourth safe height threshold, the fourth safe telescopic position, and the fifth safe telescopic position.

The present invention further provides a battery swapping control system, wherein the battery swapping control system is applied to a battery swapping device removing a battery pack from the bottom of an electric car, the battery swapping device has a liftable battery swapping platform, and the battery swapping control system comprises: a first movement control module, a removal height control module, and a battery removal module;
the first movement control module is used for controlling the battery swapping device to move to a preset battery swapping position below the electric car;
the removal height control module is used for controlling the battery swapping platform to rise to a preset removal height;
the battery removal module is used for controlling the battery swapping device to remove the battery pack from the bottom of the electric car.

Preferably, the battery swapping control system also includes a first safe height adjustment module for adjusting the height of the battery swapping platform to a first safe height threshold, the first safe height threshold is lower than the height from the lowest part of the chassis of the electric car to the driving plane of the battery swapping device.

Preferably, the battery swapping platform is provided with a distance measuring apparatus, and the battery swapping control system further comprises: a first current height acquisition module for acquiring the current height of the battery swapping platform via the distance measuring apparatus;
the first safe height adjustment module is further used for judging whether the current height is within a first range of the first safe height threshold, and if not, invoking the removal height control module.

Preferably, the control system further comprises: a first telescopic width control module for controlling the battery swapping device to move to a first safe telescopic position along a width direction of the electric car so that wheels are located within a preset parking range of a battery swapping site when the electric car moves to the battery swapping site.

Preferably, the control system further comprises: a first telescopic length control module for controlling the battery swapping device to move to a second safe telescopic position along the length direction of the electric car so as to avoid front wheels and rear wheels of the electric car when the battery swapping device located at the second safe telescopic position enters the preset battery swapping position along a width direction of the electric car.

Preferably, the battery swapping device comprises an unlocking jacking pin, the battery pack is mounted to a battery bracket, and the battery bracket comprises a locking mechanism on which an unlocking point is provided;

the battery swapping control system further comprises: a first unlocking jacking pin adjustment module for adjusting the position of the unlocking jacking pin to align the unlocking jacking pin with the unlocking point.

Preferably, the battery swapping device is provided with an unlocked position and an in situ position, wherein when the unlocking jacking pin is located at the unlocked position, the unlocking jacking pin is aligned with the unlocking point, and when the unlocking jacking pin is located at the in situ position, the unlocking jacking pin avoids the unlocking point;

the first unlocking jacking pin adjustment module is specifically used for moving the unlocking jacking pin, and judging whether the unlocking jacking pin is located at the unlocked position, if not, continuing to move the unlocking jacking pin, and if so, stopping moving the unlocking jacking pin.

Preferably, a detection sensor is provided on the battery swapping device, a detection point is provided on the unlocking jacking pin, or the detection point is provided on the battery swapping device, and the detection sensor is provided on the unlocking jacking pin;

the first unlocking jacking pin adjustment module is used for, when the detection point is located in a detection area of the detection sensor, determining that the unlocking jacking pin is located at the unlocked position.

Preferably, the battery swapping platform comprises an insertion piece, the battery pack is mounted to a battery bracket, a preset receiving position is provided on the battery bracket, and the battery swapping control system further includes an insertion position adjustment module for adjusting a position of the battery swapping platform along a length direction of the electric car to move the insertion piece to a preset insertion position, the preset insertion position being aligned with the preset receiving position.

Preferably, a receiving piece is provided above the preset receiving position:

the removal height control module comprises: a first speed control unit and a second speed control unit;
the first speed control unit is used for controlling the battery swapping platform to rise at a first speed to a first removal height, wherein when the battery swapping platform is located at the first removal height, the insertion piece is in contact with the receiving piece;
the second speed control unit is used for controlling the battery swapping platform to rise to a preset removal height at a second speed, wherein when the battery swapping platform is located at the preset removal height, the insertion piece is inserted into the receiving piece and is fitted to the receiving piece;
wherein the first speed is greater than the second speed.

Preferably, a battery bracket comprises a locking mechanism, the locking mechanism comprises a lock tongue, a locking groove, and an unlocking point, the battery pack comprises a lock shaft, and when the battery pack is locked, the lock shaft enters the locking groove through an opening of the locking groove and the lock shaft is fastened in the locking groove through the lock tongue;

the battery removal module comprises: a pre-pushing position movement unit, an unlocking jacking pin jacking unit, and a battery swapping platform movement unit;
the pre-pushing position movement unit is used for controlling the battery swapping platform to move such that the lock shaft of the battery pack moves away from the lock tongue to an unlocking pre-pushing position;
the unlocking jacking pin jacking unit is used for controlling an unlocking jacking pin of the battery swapping device to jack up the unlocking point to drive the lock tongue away from the locking groove;
the battery swapping platform movement unit is used for controlling the battery swapping platform to move such that the lock shaft of the battery pack moves toward an opening of the locking groove to an unlocked position to separate the battery pack from the battery bracket and drop a same into the battery swapping device.

Preferably, the battery removal module is further used for controlling the battery swapping device to remove the battery pack from the bottom of the electric car, and then invoking the safe height adjustment module. The safe height adjustment module is further used for adjusting the height of the battery swapping platform to a second safe height threshold, wherein a sum of the second safe height threshold and the height of the battery pack is lower than the height from the lowest part of a chassis of the electric car to a driving plane of the battery swapping device.

Preferably, the battery swapping platform comprises a lifting mechanism, an in-place switch is provided on the lifting mechanism, and the battery swapping control method further comprises: a switch triggering module for triggering the in-place switch to stop a descending of the battery swapping platform after the height of the battery swapping platform lowers to the second safe height threshold.

Preferably, the first safe height adjustment module is further used for invoking a telescopic length control module after adjusting the height of the battery swapping platform to a second safe height threshold, and the telescopic length control module is further used for controlling the battery swapping device to move to a third safe telescopic position along a length direction of the electric car so as to avoid front wheels and rear wheels of the electric car when the battery swapping device moves out from below the electric car along a width direction of the electric car.

Preferably, the first safe height adjustment module is further used for invoking the first unlocking jacking pin adjustment module after adjusting the height of the battery swapping platform to a second safe height threshold, and the unlocking jacking pin adjustment module is further used for adjusting the unlocking jacking pin of the battery swapping device to an in situ position.

Preferably, the battery swapping control system further comprises: a first identifier acquisition module, a first model matching module, and a first battery swapping parameter matching module;

the first identifier acquisition module is used for acquiring an identifier of the electric car after the electric car enters a battery swapping station;
the first model matching module is used for matching a model of the electric car according to the identifier;
the first battery swapping parameter matching module is used for matching a corresponding battery swapping parameter according to the model of the electric car, wherein the battery swapping parameter comprises at least one of the first safe height threshold, the second safe height threshold, the first safe telescopic position, the second safe telescopic position, and the third safe telescopic position.

The present invention further provides a battery swapping control system, wherein the battery swapping control system is applied to a battery swapping device mounting a battery pack in a battery bracket of an electric car, the battery swapping device has a liftable battery swapping platform, the battery pack to be mounted to the battery bracket of the electric car is placed on the battery swapping device, and the battery swapping control system comprises: a second movement control module, a mounting height control module, and a battery mounting module;

the second movement control module is used for controlling the battery swapping device to move to a preset battery swapping position below the electric car;

the mounting height control module is used for controlling the battery swapping platform to rise to a preset mounting height;

the battery mounting module is used for controlling the battery swapping device to mount the battery pack on the battery bracket of the electric car.

Preferably, the battery swapping control system further comprises a second safe height adjustment module for adjusting the height of the battery swapping platform to a third safe height threshold, the sum of the third safe height threshold and the height of the battery pack being lower than the height from the lowest part of the chassis of the electric car to the driving plane of the battery swapping device.

Preferably, the battery swapping platform is provided with a distance measuring apparatus, and the battery swapping control system further comprises: a second current height acquisition module for acquiring the current height of the battery swapping platform via the distance measuring apparatus;

the second safe height adjustment module is further used for judging whether the current height is within a third range of the third safe height threshold, and if not, adjusting the height of the battery swapping platform to the third safe height threshold.

Preferably, the battery swapping control further comprises a second telescopic length control module for controlling the battery swapping device to move to a fourth safe telescopic position along a length direction of the electric so as to avoid front wheels and rear wheels of the electric car when the battery swapping device enters the preset battery swapping position along a width direction of the electric car.

Preferably, the battery swapping control system further comprises a second unlocking jacking pin adjustment module for adjusting a position of an unlocking jacking pin so that the unlocking jacking pin avoids an unlocking point on a locking mechanism.

Preferably, a receiving piece is provided above the preset receiving position, the mounting height control module includes: a third speed control unit and a fourth speed control unit;

the third speed control unit is used for controlling the battery swapping platform to rise at a first speed to a first mounting height, wherein the insertion piece is in contact with the battery bracket when the battery swapping platform is located at the first mounting height, and the fourth speed control unit is used for controlling the battery swapping platform to rise to the preset mounting height at a second speed, wherein when the battery swapping platform is located at the preset mounting height, the insertion piece is inserted into the receiving piece and is fitted to the receiving piece;

wherein the first speed is greater than the second speed.

Preferably, the battery bracket comprises a locking mechanism, the locking mechanism comprises a locking groove provided with an opening facing the ground, the battery pack is provided thereon with a lock shaft, and the locking mechanism further comprises a lock tongue;

The battery mounting module comprises: an opening access unit, a locked position movement unit, and an opening closing unit;

the opening access unit is used for controlling the battery swapping platform to rise so that the lock shaft enters the opening and pushes open the lock tongue;

the locked position movement unit is used for controlling the battery swapping platform to move in a direction away from the lock tongue to a first locked position; and the opening closing unit is used for controlling the lock tongue to drop to close the opening.

Preferably, the battery mounting module further comprises: a fastened position movement unit. The opening closing unit is further used for controlling the battery swapping platform to move to a first locked position in a direction away from the lock tongue and then invoking the fastened position movement unit, and the fastened position movement unit is used for controlling the battery swapping platform to move so as to move the lock shaft close to the opening to be at the locked position so that the lock shaft abuts against the lock tongue.

Preferably, the fastened position movement unit comprises a locked position movement subunit, used for in the process of controlling the battery swapping platform to move away from the lock tongue, collecting a first image comprising the locking mechanism, judging whether the lock shaft is located at the first locked position according to a first standard image of the locking mechanism located at the first locked position, and if so, stopping moving the lock shaft, and if not, continuing to move the lock shaft.

Preferably, the fastened position movement unit comprises a fastened position movement subunit, used for in the process of controlling the battery swapping platform to move so as to move the lock shaft to the opening, collecting a second image comprising the locking mechanism, and judging whether the lock shaft is located at the fastened position according to a second standard image of the locking mechanism located at the fastened position, and if so, stopping moving the lock shaft, and if not, continuing to move the lock shaft.

Preferably, the battery mounting module is further used to control the battery swapping device to mount the battery pack to the battery bracket of the electric car, and then invoke the second safe height adjustment module. The second safe height adjustment module is used to adjust the height of the battery swapping platform to the fourth safe height, and the fourth safe height is lower than the height from the lowest part of the chassis of the electric car to the driving plane of the battery swapping device.

Preferably, the battery swapping control system further comprises: a second identifier acquisition module, a second model matching module, and a second battery swapping parameter matching module;

the second identifier acquisition module is used for acquiring an identifier of the electric car after the electric car enters a battery swapping station;

the second model matching module is used for matching a model of the electric car according to the identifier; and the second battery swapping parameter matching module is used for matching a corresponding battery swapping parameter according to the model of the electric car, wherein the battery swapping parameter comprises at least one of the third safe height threshold, the fourth safe height threshold, the fourth safe telescopic position, and the fifth safe telescopic position.

The present invention further provides an electronic device, comprising a memory, a processor, and a computer program stored in the memory and capable of running on the processor, wherein the processor implements the above-mentioned battery swapping control method when executing the computer program.

The present invention further provides a computer-readable storage medium having stored thereon a computer program, wherein the computer program, when executed by a processor, implements the above-mentioned steps of the battery swapping control method.

The positive effects of the invention are as follows: by means of controlling the battery swapping platform to rise to the preset removal height after controlling the battery swapping device to move to the preset battery swapping position below the electric car, and then controlling the battery swapping device to remove the battery pack from the bottom of the electric car, the entire procedure of the battery swapping process is controlled, increasing battery swapping efficiency and reducing the safety hazards in the battery swapping process.

DETAILED DESCRIPTION OF THE PREFERRED EMBODIMENT

The invention is further illustrated by way of the following embodiments, without thereby limiting the invention to the scope of the described embodiments.

Before describing the embodiments of the present invention in detail, a brief description of a battery swapping device is provided.

Figure 1:
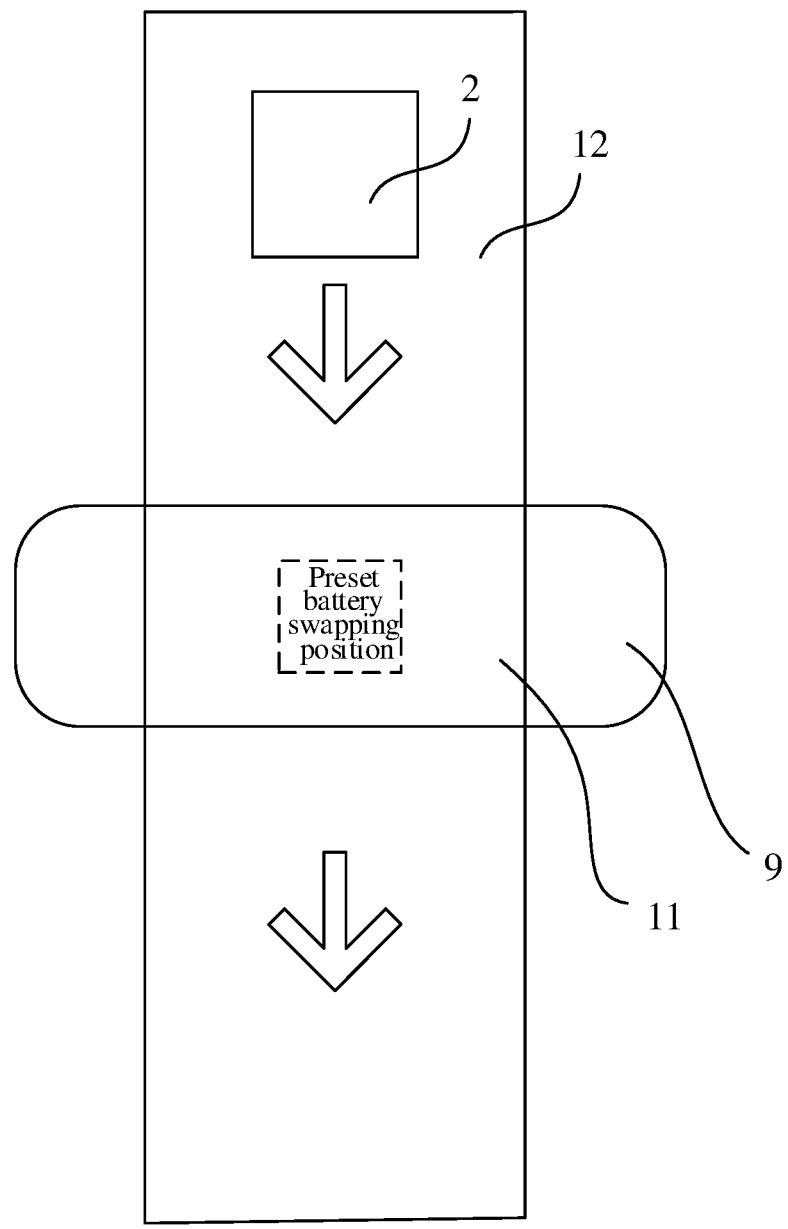
FIG. 1 is a schematic top view of a battery swapping process of a vehicle.

As shown in FIG. 1, the battery swapping device 2 is a bottom battery swapping device for removing a battery pack from the bottom of a vehicle and mounting the battery pack, and has a liftable battery swapping platform. The battery swapping device walks on a walking plane 12. It should be understood that the walking plane may be arranged either above or below the ground. A preset battery swapping position is provided in the walking plane 12. The preset battery swapping position corresponds to the up and down of a battery swapping work station. That is to say, when the battery swapping device 2 is located at the preset battery swapping position, the battery swapping device is aligned with the battery pack at the bottom of the vehicle, and the battery swapping device 2 only needs to adjust the height of the battery swapping platform up and down in combination with a small degree of horizontal movement or no horizontal movement, so that the battery swapping platform passes through the battery swapping work station to reach the bottom of the vehicle, thereby completing the removing or mounting of the battery pack. The first track can also be arranged in the walking plane 12 of the battery swapping device for the battery swapping device to walk. One end of the first track is directed to the preset battery swapping position, and the other end may be directed to other positions near the charging rack or the battery transferring apparatus.

The arrow in FIG. 1 indicates a feasible walking route of the battery swapping device 2, namely, enter the vehicle bottom from one end of the walking plane 12 of the battery swapping device, and then exit the vehicle bottom from the other end; however, other walking routes may also be adopted by the battery swapping device 2, namely, enter the vehicle bottom from one end of the walking plane 12 of the battery swapping device, and then retreat from and exit the vehicle bottom from the same end.

Figure 2:
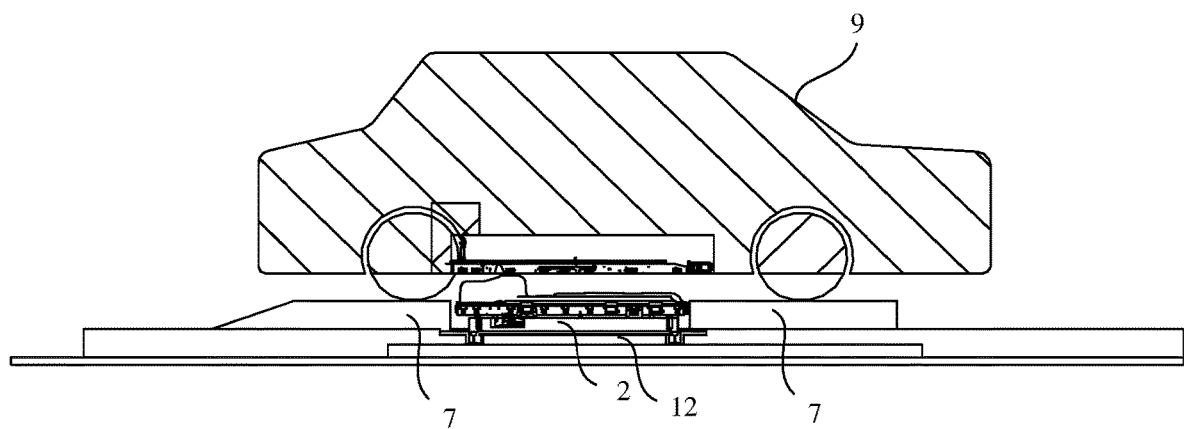
FIG. 2 shows a schematic structural diagram of a first battery swapping site of a battery swapping station.
Figure 3:
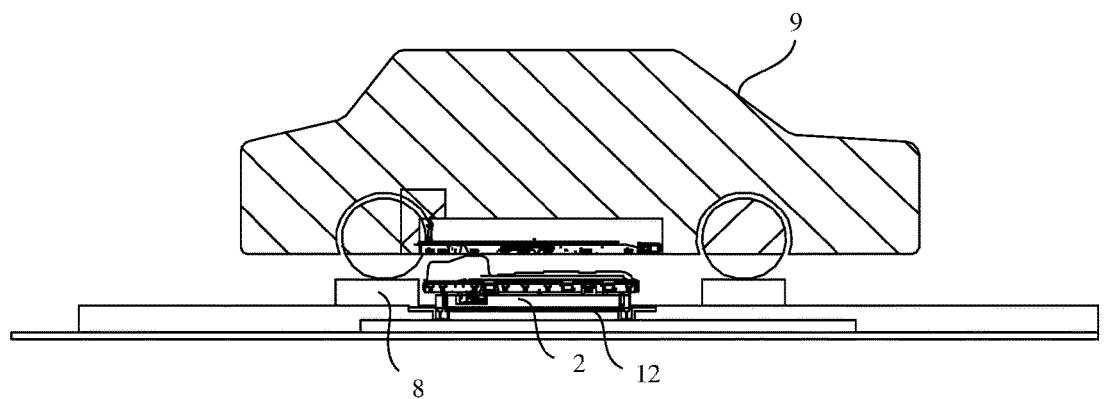
FIG. 3 shows a schematic structural diagram of a second battery swapping site of a battery swapping station.

FIG. 2 and FIG. 3 schematically show schematic structural diagrams of battery swapping sites of two models of battery swapping stations. As shown in FIG. 2, in this case, the battery swapping station has a stationary vehicle-carrying platform 7, the stationary vehicle-carrying platform 7 is a non-liftable vehicle-carrying platform, the walking plane 12 of the battery swapping device 2 is lower than the stationary vehicle-carrying platform 7, and after the battery swapping device 2 travels to a preset battery swapping position, the electric car drives into the stationary vehicle-carrying platform 7. Thereafter, the battery swapping device 2 can achieve battery pack replacement by moving under the electric car 9.

As shown in FIG. 3, in this case, the battery swapping station has a liftable vehicle-carrying platform 8. When the electric car does not drive in, the liftable vehicle-carrying platform 8 can maintain a state parallel to the driving plane 12 of the battery swapping device; when the electric car is parked on the liftable vehicle-carrying platform 8, the liftable vehicle-carrying platform 8 lifts the electric car 9 to make room under the electric car, so that the battery swapping device 2 can shuttle at the bottom of the electric car to realize the replacement of the battery pack.

Figure 4:
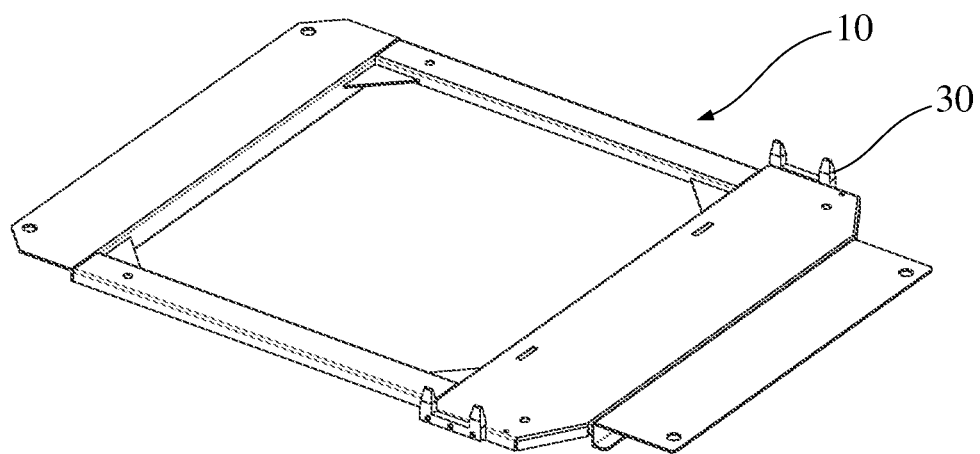
FIG. 4 shows a schematic structural diagram of a battery tray for a battery swapping device.
Figure 5:
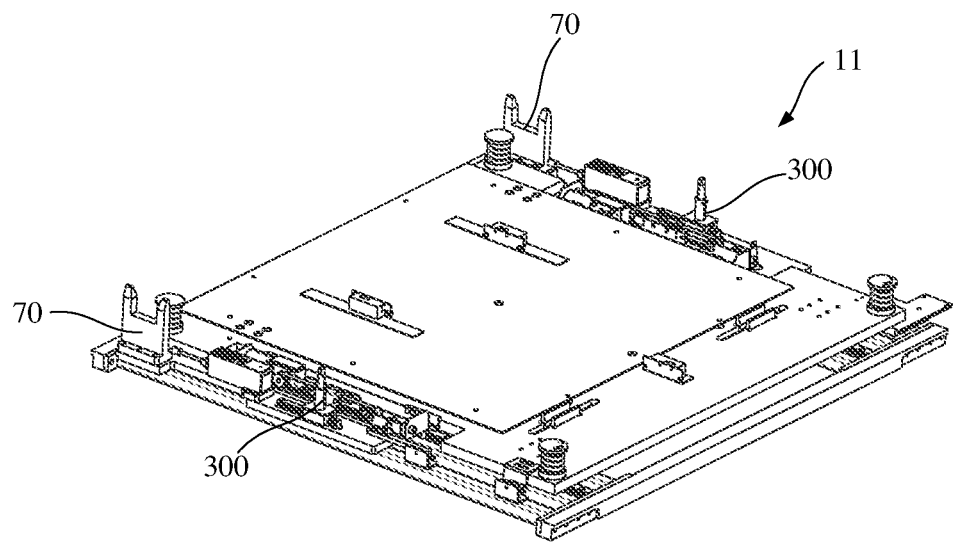
FIG. 5 shows a schematic structural diagram of a lower frame of a battery swapping device.

FIGS. 4 and 5 respectively show a schematic diagram of a battery tray 10 and a lower frame 11 of a battery swapping device. As shown in FIG. 4, the first positioning fork 30 is fixed on the battery tray 10 for cooperating with a positioning block on a battery pack, and the positioning block of the battery pack may be a positioning block specially cooperating with the first positioning fork 30, or may be a structure realizing other functions and also having the function of positioning after cooperating with the first positioning fork 30.

As shown in FIG. 5, the second positioning fork 70 is fixed on the lower frame 11, and the second positioning fork 70 is used for cooperating with a positioning seat of an electric car. The positioning seat of the electric car may be a positioning seat specially cooperating with the second positioning fork 70, or may be a structure realizing other functions and also having the function of positioning after cooperating with the second positioning fork 70, such as a lock base, etc.

Figure 6:
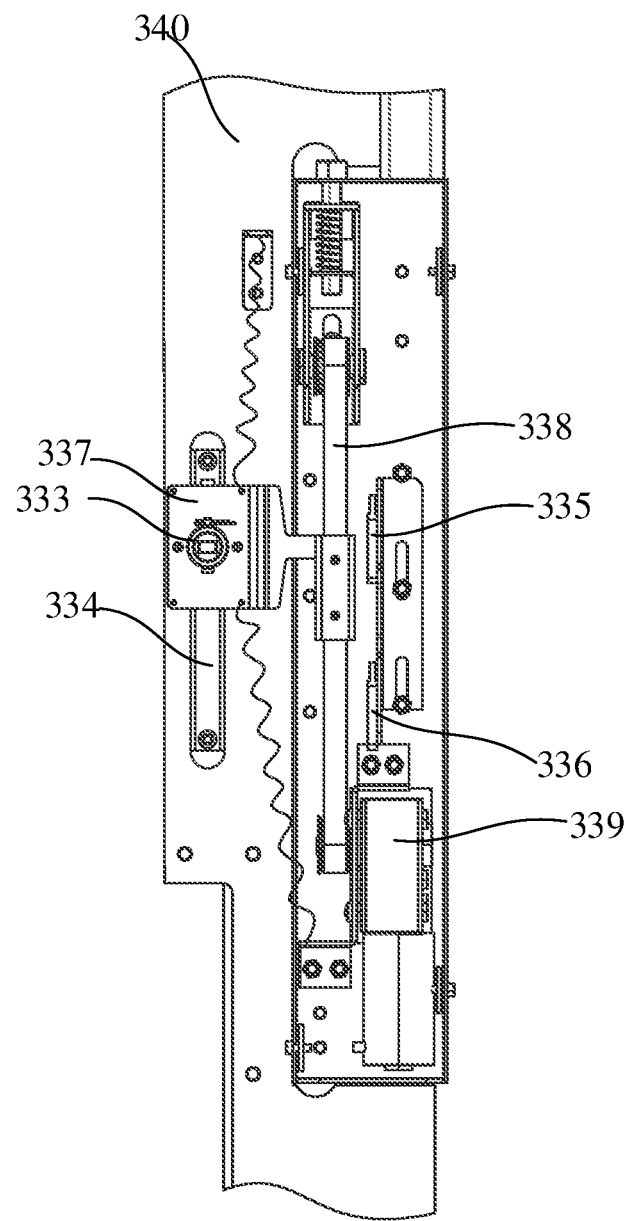
FIG. 6 is a schematic diagram of an internal structure of an unlocking apparatus.
Figure 7:
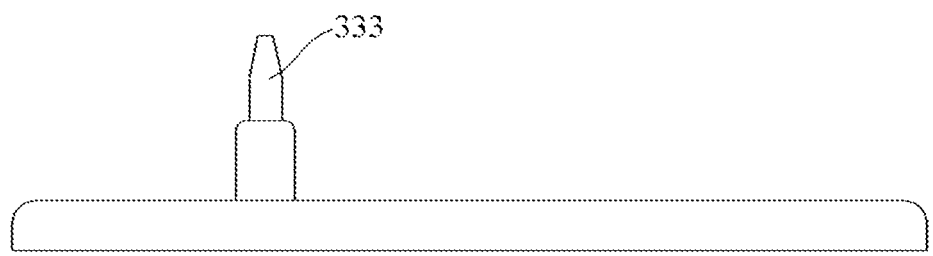
FIG. 7 is a side view of an unlocking apparatus.
Figure 8:
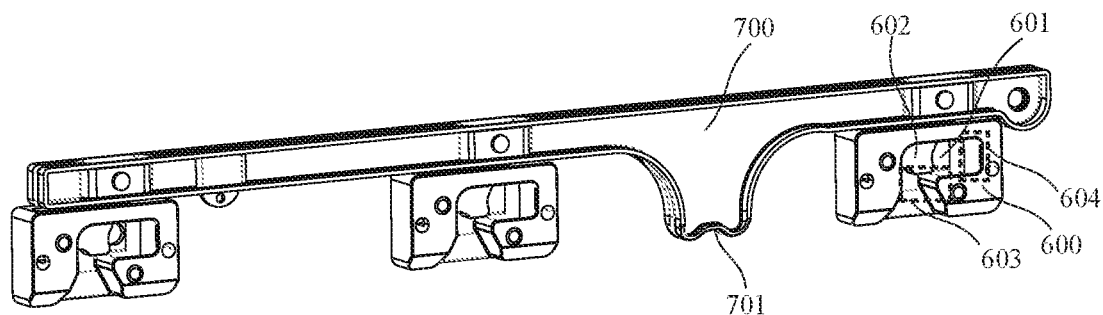
FIG. 8 shows a schematic diagram of a mechanism of a locking mechanism.
Figure 9:
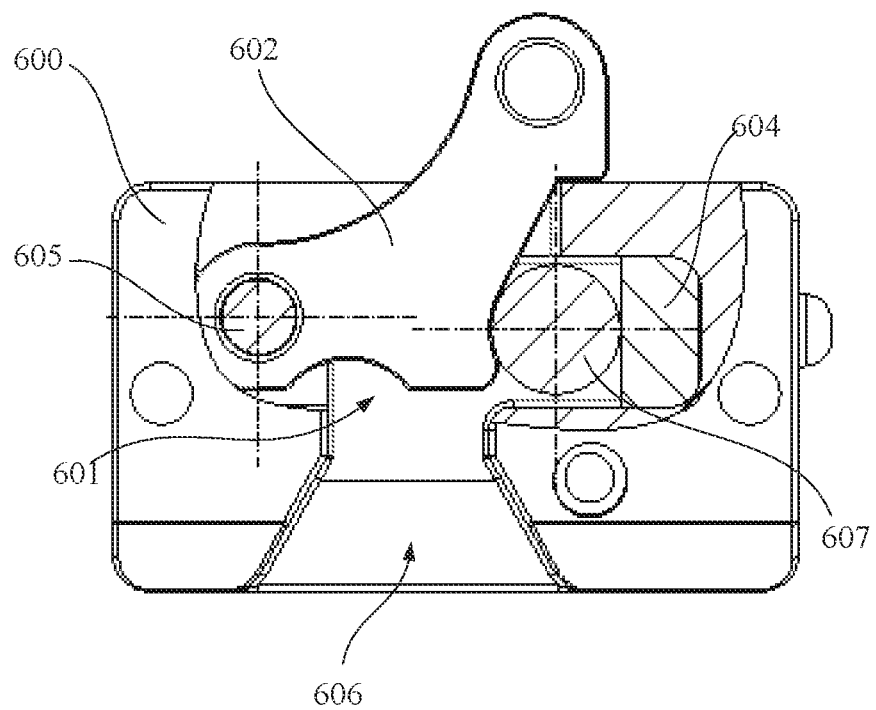
FIG. 9 is a schematic diagram of a first state of a locking mechanism.

The unlocking apparatus 300 is fixed on the second lower frame 11. FIGS. 6 and 7 show a specific structure of the unlocking apparatus 300, including an unlocking jacking pin 333, a guide rail 334, a sliding block 337, a transmission assembly 338, a driving assembly 339, and a bottom plate 340. The guide rail 334 is fixed on the bottom plate 340, the sliding block 337 slides on the guide rail 334, the unlocking jacking pin 333 is fixed on the sliding block 337, and when the sliding block 337 slides on the guide rail 334, the unlocking jacking pin 333 passes through the unlocked position and the in-situ position.

The unlocking apparatus 300 further includes a first sensor 335 for detecting whether the position of the unlocking jacking pin 333 reaches the unlocked position, and a second sensor 336 for detecting whether the position of the unlocking jacking pin 333 reaches the in-situ position.

The locking mechanism in an electric car is further described below.

FIGS. 8-11 illustrate a locking mechanism of an electric car, the locking mechanism comprising a lock connecting rod 700, a lock base 600, and a lock tongue 602. The lock tongue 602 is rotatably mounted to the lock base 600 around a rotating shaft 605, the lock base 600 has a locking groove 601 for locking and fixing a lock shaft 607 of a battery pack, the locking groove 601 has an opening 606, the lock shaft 607 of the battery pack can enter and exit the locking groove 601 through the opening 606, and the lock shaft 607 located in the locking groove 601 can be in a locked state or an unlocked state by the rotation of the lock tongue 602. Specifically, referring to FIGS. 9 to 11, when the lock tongue 602 is rotated downward to the position shown in FIG. 9, the lock shaft 607 located in the locking groove 601 is in the locked state, and when the lock tongue 602 is rotated upward to the position shown in FIG. 11, the lock shaft 607 is converted to the unlocked state and can be taken out of the locking groove 601.

The locking mechanism further includes an elastic piece 604 that acts on the lock shaft 607 such that the lock shaft 607 in the locked state is press-fixed in a locked position in the locking groove 601 by the elastic piece 604 and the lock tongue 602.

Figure 10:
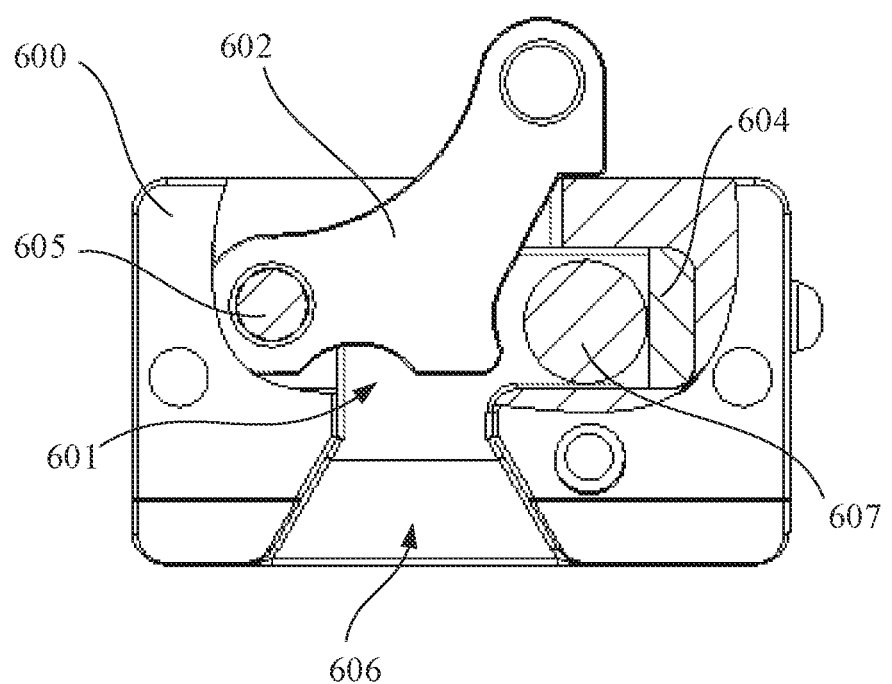
FIG. 10 is a schematic diagram of a second state of a locking mechanism.
Figure 11:
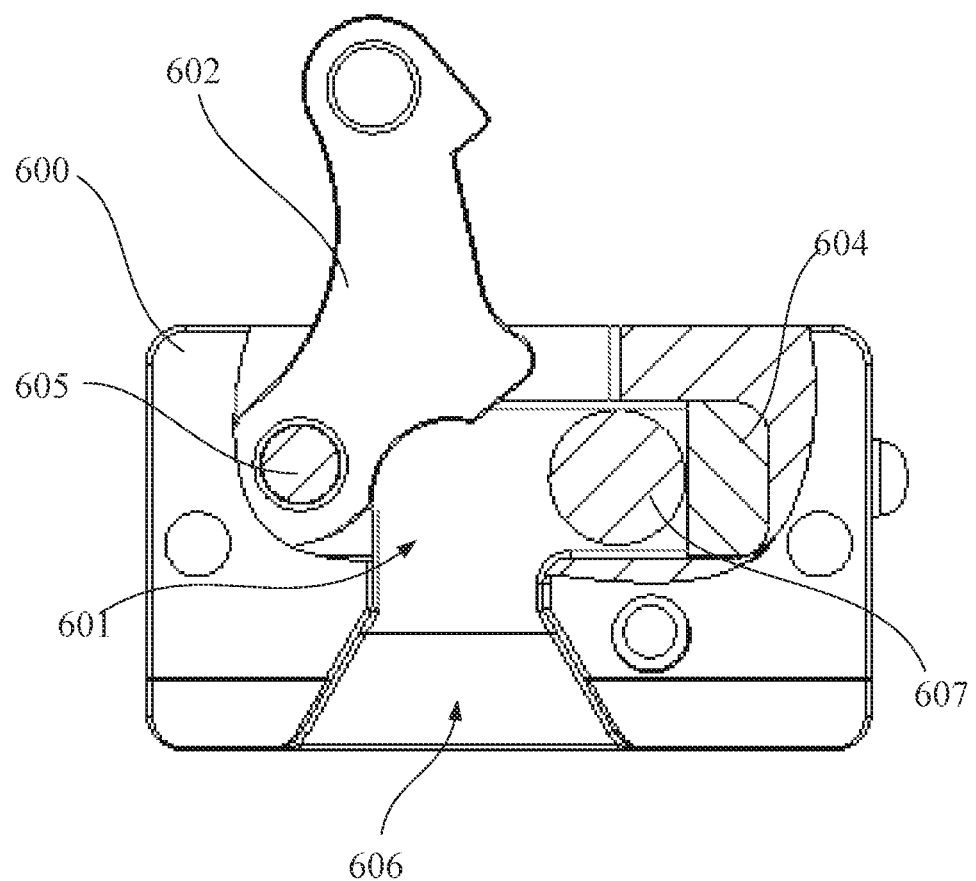
FIG. 11 is a schematic diagram of a third state of a locking mechanism.

The lock connecting rod 700 is provided with an unlocking piece 701, the rotating end 605 of each locking lock tongue 602 is connected to the lock connecting rod 700, the unlocking jacking pin 333 drives the movement of the unlocking piece 701 so as to drive the movement of the whole lock connecting rod 700, and multiple lock tongues 602 can all rotate synchronously, thereby achieving the synchronous locking and unlocking of multiple lock shafts 607 by multiple lock tongues 602. In the present embodiment, the rotating end 605 is rotationally connected to the lock connecting rod 700 (e.g. by using a pin shaft). The lock connecting rod 700 is driven by an external force so that all lock tongues 602 can be driven to rotate synchronously, and multiple lock tongues 602 can be synchronously switched from the locked state (FIG. 9) to the unlocked state (FIG. 11) via an intermediate state (FIG. 10).

It needs to be noted that the above-mentioned contents and the drawings only schematically show a battery swapping device and a locking mechanism applicable to a battery swapping control method the following embodiments, but do not indicate that the following embodiments can be applied only to the clip lane, battery swapping device, and locking mechanism of the above-mentioned structure or pattern, and the clip lane and battery swapping device, which are the same or similar in function and the principle of battery swapping, are also applicable to the following embodiments.

Embodiment 1

Figure 12:
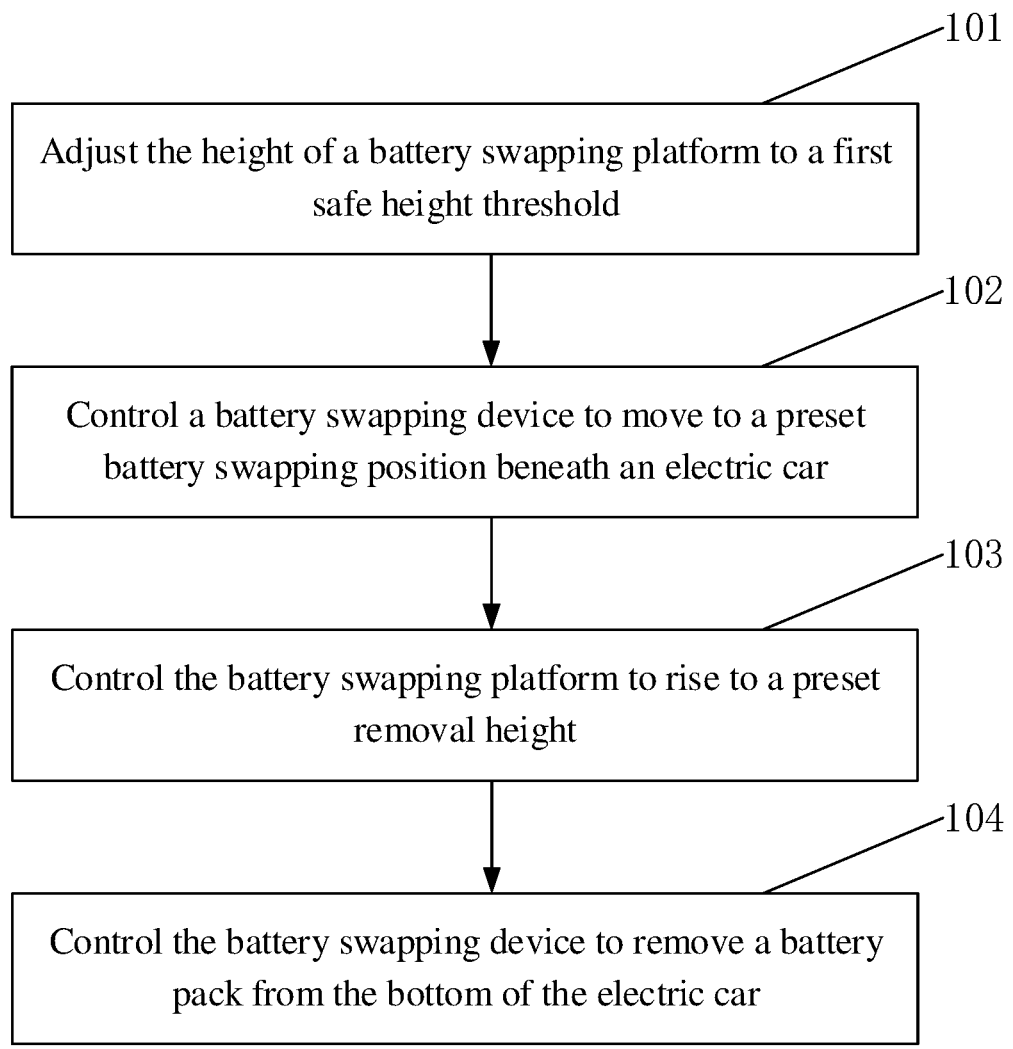
FIG. 12 is a partial flow chart of a process of removing a battery pack in a battery swapping control method according to embodiment 1 of the present invention.

The present embodiment provides a battery swapping control method. As shown in FIG. 12, when a battery swapping device removes a battery pack from the bottom of an electric car, the battery swapping control method includes:
- step 101, adjusting the height of a battery swapping platform to a first safe height threshold;
- step 102, controlling a battery swapping device to move to a preset battery swapping position beneath an electric car;
- step 103, controlling the battery swapping platform to rise to a preset removal height; and
- step 104, controlling the battery swapping device to remove a battery pack from the bottom of the electric car.

The height of the battery swapping platform can be adjusted according to the overall height of the battery swapping device; since for different models of electric cars, there may be differences in the distance from the bottom of the electric car to the driving plane of the electric car, in the present embodiment, a corresponding first safe height threshold can be acquired according to different models of electric cars; specifically, the battery swapping station stores in the background a corresponding relationship between an identifier (such as a license plate) of the electric car and the model of the electric car, and a corresponding relationship between the model of the electric car and the first safe height threshold such that when the electric car enters a battery swapping station, the identifier of the electric car can be acquired, and based on the data stored in the background, the model of the electric car corresponding to the identifier is matched, and the first safe height threshold corresponding to the model of the electric car is matched.

It should be understood that the background of the battery swapping station also stores a corresponding relationship between the model of the electric car and other parameters, including a second safe height threshold, a third safe height threshold, a fourth safe height threshold, a first safe telescopic position, a second safe telescopic position, a third safe telescopic position, a fourth safe telescopic position, a fifth safe telescopic position, etc. Accordingly, the above-mentioned various parameters can be obtained by matching the model of the electric car when the electric car enters the battery swapping station or after it enters the battery swapping station.

The first safe height threshold is lower than the height from the lowest part of the chassis of the electric car to the driving plane of the battery swapping device, so that when the battery swapping device moves below the electric car or when the electric car moves above the battery swapping device, the battery swapping device avoids the bottom of the electric car. Specifically, a distance measuring apparatus is provided on the battery swapping platform. In step 101, the current height of the battery swapping platform can be acquired via the distance measuring apparatus, and when the acquired current height of the battery swapping platform is not at the first safe height threshold, the current height of the battery swapping platform is adjusted to the first safe height threshold; when the acquired current height of the battery swapping platform is within the first range of the first safe height threshold, step 102 can be directly executed. Here, the first range may be set according to actual requirements, and it is not limited herein.

In the present embodiment, by adjusting the height of the battery swapping platform to the first safe height threshold, then controlling the battery swapping device to move below the electric car, the situation that the battery swapping device collides with the bottom of the electric car during the process that the battery swapping device moves to be below the electric car or the electric car moves to be above the battery swapping device is avoided. On the one hand, it can effectively prevent the electric car from being damaged, and on the other hand, it also improves the efficiency of removing a battery pack from a battery swapping device.

In order to further ensure the safety of the battery swapping process, in one case, when the battery swapping device first drives to a preset battery swapping position, and the electric car then enters the stationary vehicle-carrying platform 7 (as shown in FIG. 2), and in order to ensure that when the electric car enters the vehicle-carrying platform, the wheel can drive over the battery swapping device while avoiding the wheel from getting into the space between the stationary vehicle-carrying platforms 7. Before step 102, a step can be further included:

judging whether the battery swapping device is located within a first telescopic range of the first safe telescopic position; and if yes, maintaining the current position, and if no, controlling the battery swapping device to move to the first safe telescopic position along the width direction of the electric car so that the wheels are located within a preset parking range of the battery swapping site when the electric car moves to the battery swapping site.

The preset parking range is a position between a preset first positioning mechanism (such as a first roller) on the vehicle-carrying platform and a preset second positioning mechanism (such as a second roller) on the battery swapping device, the first safe telescopic position being a position along the width direction of the electric car. When controlling the electric car to move to the first safe telescopic position, the control can be performed according to a pre-calibrated position. Specifically, a certain specific position can be calibrated to be an original position (such as a position when a battery swapping small car sets off); since when the electric car enters a battery swapping station, the first safe telescopic position of the electric car has been acquired according to the model of the electric car, and when the motor controls the battery swapping device to move, since the distance that the battery swapping device is controlled to move by every rotation of the driving shaft of the motor is fixed, the actual moving distance of the battery swapping device can be known according to the number of rotations of the motor in the actual operation process. By judging whether the actual moving distance of the electric car matches the first safe telescopic position acquired from the background, whether the battery swapping device is located at the first safe telescopic position can be monitored in real time.

In the present embodiment, by controlling the battery swapping device to move to the first safe telescopic position, on the one hand, it is possible to avoid the situation that the battery swapping device is not stopped in place which would otherwise cause the wheels fall into the crack of the vehicle-carrying platform when the electric car drives to the vehicle-carrying platform and thus affect the efficiency of battery swapping; on the other hand, it is also possible to avoid that the battery swapping device is stopped too far which would otherwise make it difficult for the battery swapping device to replace the battery for the electric car.

In another case, when the electric car first enters the liftable vehicle-carrying platform 8 and the battery swapping device then enters a preset battery swapping position (as shown in FIG. 3), in order to ensure that front wheels and rear wheels of the electric car are not touched when the battery swapping device enters the bottom of the electric car, before step 102, a step may further be included:

judging whether the battery swapping device is located in a second telescopic range of the second safe telescopic position; and if so, maintaining the current position, and if not, controlling the battery swapping device to move to the first safe telescopic position along the length direction of the electric car so as to avoid front wheels and rear wheels of the electric car when the battery swapping device located at the first safe telescopic position enters a preset battery swapping position along the width direction of the electric car.

It should be understood that the second safe telescopic position is a position along the length direction of the electric car between front wheels and rear wheels of the electric car. The specific manner of controlling the battery swapping device to move the second safe telescopic position is consistent with the above-mentioned specific manner of controlling the battery swapping device to move to the first safe telescopic position, which will not be described in detail herein.

In the present embodiment, by controlling the battery swapping device to move to be below the electric car after controlling the battery swapping device to move to the second safe telescopic position along the length direction of the electric car, it avoids collisions with the tires of the electric car during the process of the battery swapping device moving to be below the electric car. Therefore, the battery swapping efficiency is improved while further preventing the electric car body from being damaged.

In step 102, after the battery swapping device is located at the preset battery swapping position, in order to further ensure that the battery swapping device is at the correct battery swapping position, the position of the battery swapping device can also be further adjusted, for example, it being possible to provide a visual sensor on the battery swapping device such that a photo of the bottom of the electric car can be taken in real time via the visual sensor, and a certain position can be determined at the bottom of the electric car as a reference position (such as the edge of a lock base). By judging whether the reference position in the real-time captured photo matches the reference position in the standard reference photo, whether the battery swapping device is aligned with the battery pack is judged.

In the present embodiment, after the battery swapping device is located at the correct battery swapping position, the step of adjusting the position of the unlocking jacking pin can be further included so that the unlocking jacking pin is aligned with the unlocking piece. Therefore, the unlocking of the battery pack can be achieved. Since the battery pack to be removed is mounted to the battery bracket, the battery bracket comprises a locking mechanism, and the battery pack is mounted to the battery bracket via the locking mechanism, as shown in FIGS. 8-11, the unlocking piece 701 is acted on by the unlocking jacking pin 333 to drive the locking mechanism to switch from the locking state (FIG. 9) to the unlocking state (FIG. 11) so as to unlock the battery pack from the battery bracket, and then the battery pack is driven to move by the battery swapping device so that the lock shaft 607 of the battery pack is disengaged from the locking mechanism, thereby completing the removal of the battery pack. The unlocking jacking pin 333 is movably arranged on the battery swapping device, and the battery swapping device is provided with an unlocked position and an in situ position; when the unlocking jacking pin 333 is located at the unlocked position, the unlocking jacking pin 333 is aligned with the unlocking piece 701; when the unlocking jacking pin 333 is located at the in situ position, the unlocking jacking pin 333 avoids the unlocking piece 701.

Figure 13:
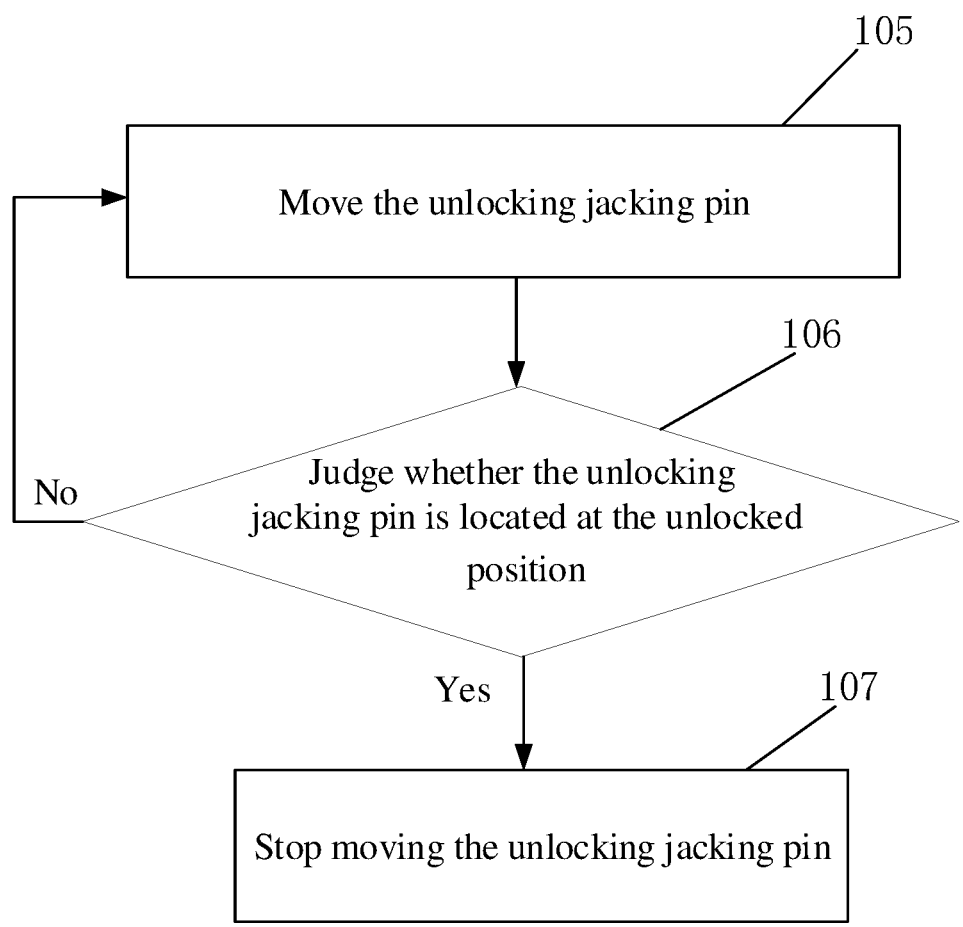
FIG. 13 is a partial flowchart of a battery swapping control method according to embodiment 1 of the present invention.

Specifically, as shown in FIG. 13, the step of adjusting the position of the unlocking jacking pin comprises:
  step 105, moving the unlocking jacking pin;
  step 106, judging whether the unlocking jacking pin is located at the unlocked position; and if so, executing step 107, and if not, returning to step 105; and
  step 107, stopping the movement of the unlocking jacking pin.

Step 106 specifically comprises: when a detection point is located in a detection area of a detection sensor, determining that the unlocking jacking pin is located at the unlocked position or the in situ position. When the detection point is located in the detection area for detecting an unlocked position detection sensor, it is determined that the unlocking jacking pin is located at the unlocked position. When the detection point is located in the detection area for detecting the in situ position detection sensor, the unlocking jacking pin is located in the in situ position.

As shown in FIG. 6, in one mode, a first sensor 335 and a second sensor 336 are provided on the battery swapping device. The first sensor 335 is used for detecting whether the unlocking jacking pin 333 reaches the unlocked position, and the second sensor 336 is used for detecting whether the unlocking jacking pin 333 reaches the original position; in one mode, when specific implementation is performed, a detection point may be provided on the unlocking jacking pin, and whether the unlocking jacking pin is located at the unlocked position or at the in situ position is judged by judging whether the detection point is located in a detection area of the detection sensor; the unlocking jacking pin 333 may also not be provided with a detection point; in this case, the model of the sensor is a proximity sensor; specifically, during the sliding of the sliding block 337, the unlocking jacking pin 333 will gradually approach the first sensor 335 or the second sensor 336; when the distance of the unlocking jacking pin 333 from a certain sensor is less than a preset distance, the corresponding sensor will detect the unlocking jacking pin 333; at this moment, the sliding of the sliding block 337 stops, and it is confirmed that the unlocking jacking pin 333 is located at the unlocked position or the original position.

In another implementation mode, it is also possible to provide a detection point on the battery swapping device and a detection sensor on the unlocking jacking pin. The detection of the detection point by the detection sensor makes it possible to accurately and effectively judge whether the unlocking jacking pin is in the unlocked position or the in situ position.

In the present embodiment, by adjusting the position and attitude of the unlocking jacking pin, the unlocking jacking pin can be located in the unlocked position when the battery swapping device is unlocking, thereby improving the accuracy of the unlocking process.

As shown in FIGS. 4 and 5, in the present embodiment, the battery swapping device comprises a battery tray 10 and a lower frame 11, and two sides of the lower frame 11 are respectively provided with a second positioning fork 70 for forking the battery swapping car so as to be fixed relative to the battery swapping car. The battery tray 10 is provided on the battery swapping platform and moves along with the battery swapping platform. The first positioning fork 30 is provided on the side edge of the battery tray 10, and the second positioning fork 70 is provided on the side edge of the lower frame 11. The first positioning fork 30 and the second positioning fork 70 both have a groove with an opening facing upwards, respectively used for inserting and clamping a positioning block (such as a lock shaft) on the battery pack and a positioning seat (such as a lock base) on the battery bracket. By clamping the first positioning fork 30 into the positioning block and the second positioning fork 70 into the positioning seat, the lower frame 11 can be fixed when the battery swapping platform moves, and the battery tray 10 can be moved to take out the battery pack.

In the present embodiment, after step 102, the step of adjusting the position of the battery swapping platform along the length direction of the electric car can also be included to move the insertion piece to a preset insertion position, where the preset insertion position is aligned with the preset receiving position. It should be understood that the insertion piece here comprises a first positioning fork 30 and a second positioning fork 70, where the receiving position is the positioning block or positioning seat previously described. Specifically, the battery swapping device may comprise a visual sensor, and a preset detection position (such as an edge of the insertion piece) may be provided on the insertion piece. After step 102, the visual sensor may be controlled to shoot the bottom of the electric car to form a detection photo, and whether the preset detection position in the detection photo is consistent with the position of the preset detection position in a standard photo (a photo taken when the insertion piece is at the preset insertion position) is judged, and if not, the position of the battery swapping device is adjusted along the length direction of the electric car.

When the insertion piece is moved to the preset insertion position, specifically, step 103 may comprise: controlling the battery swapping platform to rise to a first removal height at a first speed and controlling the battery swapping platform to rise to a preset removal height at a second speed, wherein the first speed is greater than the second speed. When the battery swapping platform is located at the first removal height, the first insertion piece 30 is in contact with the positioning block on the battery pack, and the second insertion piece 70 is in contact with the positioning seat on the battery bracket; when the battery swapping platform is located at the preset removal height, the first insertion piece 30 is inserted into the positioning block on the battery pack and is completely fitted with the same, and the second insertion piece 70 is inserted into the positioning seat on the battery bracket and is completely fitted with the same.

In the present embodiment, the impact of the insertion piece on the positioning block or the positioning seat can be reduced by reducing the speed after the insertion piece contacts the positioning block or the positioning seat, thereby not only protecting the receiving piece, the positioning block, and the positioning seat, and improving the service life, but also avoiding the influence on other components during the unlocking process.

Figure 14:
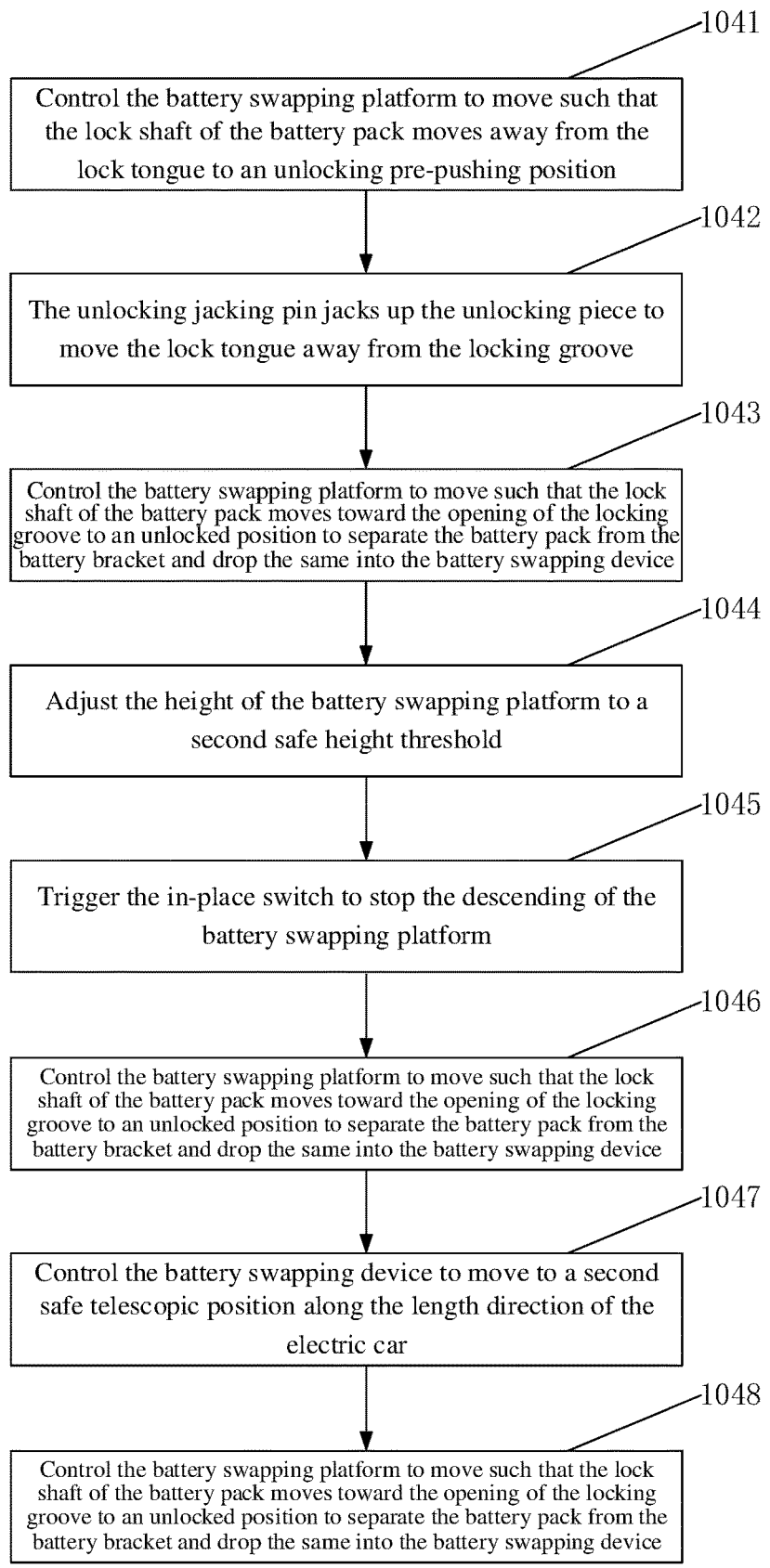
FIG. 14 is a flowchart of the implementation mode of step 104 according to embodiment 1 of the present invention.

In order to prevent the lock shaft 607 of the battery pack from being caught in the locking groove 601 due to the putting down state of the lock tongue 602 in the locked state during the removal of the battery pack, step 104 may further include a pre-pushing step so that the lock tongue 602 may make a certain space for the locking groove 601 to allow the lock shaft to move out of the locking groove 601. Specifically, as shown in FIG. 14, the above-mentioned pre-pushing step comprises:

step 1041, controlling the battery swapping platform to move such that the lock shaft of the battery pack moves away from the lock tongue to an unlocking pre-pushing position.

After performing the above-described pre-pushing step, the following steps are then executed to separate the battery pack from the battery bracket:

step 1042, the unlocking jacking pin jacking the unlocking piece to move the lock tongue away from the locking groove; and step 1043, controlling the battery swapping platform to move such that the lock shaft of the battery pack moves toward the opening of the locking groove to an unlocked position to separate the battery pack from the battery bracket and drop the same into the battery swapping device.

After the battery swapping platform rises to the preset removal height, since the lock tongue 602 blocks the opening 606 from which the lock shaft 607 enters and exits the locking groove 601, the lock tongue 602 needs to be further rotated upwards so as to open the opening 606, and the lock shaft 607 located in the locking groove 601 restricts the rotating upwards of the lock tongue 602; therefore, the lock shaft 607 needs to move away from the lock tongue 602 so as to relieve the restriction on the rotation of the lock tongue 602; when the lock shaft 607 is located at the unlocking pre-pushing position, the lock tongue can rotate upwards relative to the lock base 600 so as to open the opening 606 of the locking groove 601. In step 1041, the battery swapping platform is controlled to move so as to make room for the movement of the lock tongue 602 in the locking groove 601; in step 1042, since the unlocking point 701 is subjected to the jacking-up force by the unlocking jacking pin 333, the lock tongue 602 is moved upwards driven by the locking connecting rod 700 so as to open the opening from which the lock shaft is in and out of the locking groove, so that the lock shaft 607 can leave the locking groove 601 from the opening 606. Thereafter, by, through step 1043, controlling the battery swapping platform to move in a direction opposite to the direction in step 1041 to the unlocked position, and then controlling the battery swapping platform to vertically descend, the lock shaft 607 of the battery pack is disengaged from the locking mechanism, thus completing the removal of the battery pack from the electric car.

In addition, in the present embodiment, an in-place switch is provided on the lifting mechanism of the battery swapping platform, and after the battery pack is dropped onto the battery swapping device, the following steps are then executed to enable the battery swapping device to take out the battery pack with power loss from the bottom of the electric car:

step 1044, adjusting the height of the battery swapping platform to a second safe height threshold;

step 1045, triggering the in-place switch to stop the descending of the battery swapping platform;

step 1046, controlling the battery swapping device to move to a third safe telescopic position along the length direction of the electric car;

step 1047, adjusting the unlocking jacking pin to the in situ position; and step 1048, controlling the battery swapping device to be taken out from the bottom of the electric car.

In the present embodiment, the height of the battery swapping platform can be adjusted according to the overall height of the battery swapping device and the battery pack having power loss. The sum of the second safe height threshold and the height of the battery pack having power loss is lower than the height from the lowest part of the chassis of the electric car to the driving plane of the battery swapping device so as to avoid the bottom of the electric car when the battery swapping device carrying the battery pack having power loss moves to be below the electric car. Specifically, the manner of adjusting the height of the battery swapping platform in step 1044 may be referred to the manner of adjusting the height of the battery swapping platform in step 101, and will not be described in detail herein. The second range may be set according to actual requirements, and this is not limited herein.

Since the width of the battery pack may be greater than the width of the battery swapping device, before controlling the battery swapping device to move out of the bottom of the electric car, it is necessary to first control the battery swapping device to move to a third safe telescopic position along the length direction of the electric car so that the battery swapping device carrying the battery pack with power loss avoids front wheels and rear wheels of the electric car when moving out. The specific manner of controlling the battery swapping device to move to the third safe telescopic position may be referred to the aforementioned manner of controlling the battery swapping device to move the first safe telescopic position, and the description thereof will not be repeated herein.

In the present embodiment, after the height of the battery swapping platform is adjusted to the second safe height threshold, the battery swapping device is adjusted to move to the third safe telescopic position, and then the battery swapping device is controlled to move out from below the electric car, so as to avoid the situation of the collision with the bottom of the electric car or the wheels of the electric car during the process of the battery swapping device moving out from below the electric car. On the one hand, the electric car can be effectively prevented from being damaged, and on the other hand, the efficiency of the battery swapping device for removing the battery pack is also improved.

In step 1045, by triggering the in-place switch, after the battery swapping platform descends to the second safe height threshold, the continuous descent of the battery swapping platform can be avoided, so that the descent time of the battery swapping platform can be reduced, and the overall efficiency of the battery swapping process is improved.

At this point, a series of operations of removing the battery pack for the electric car have been completed.

In the present embodiment, after the battery swapping device is removed from the bottom of the electric car, the battery swapping device continues to be controlled to move to the battery rack. The battery rack comprises at least a first region and a second region; the first region is used for placing a fully charged battery pack, and the second region is used for placing a battery pack with power loss; in the present embodiment, the following steps are performed: controlling the battery swapping device to place the battery pack with power loss to the first region on the battery rack and removing the fully charged battery pack from the second region, and controlling the battery swapping device carrying the fully charged battery pack to drive to the electric car, or controlling the battery swapping device to move to a stacker crane, placing the battery pack with power loss on the stacker crane, and taking out the fully charged battery pack from the stacker crane.

In another implementation mode, after the battery swapping device is removed from the bottom of the electric car, another battery swapping device carrying a fully charged battery pack may also be controlled to drive to the electric car.

Embodiment 2

Figure 15:
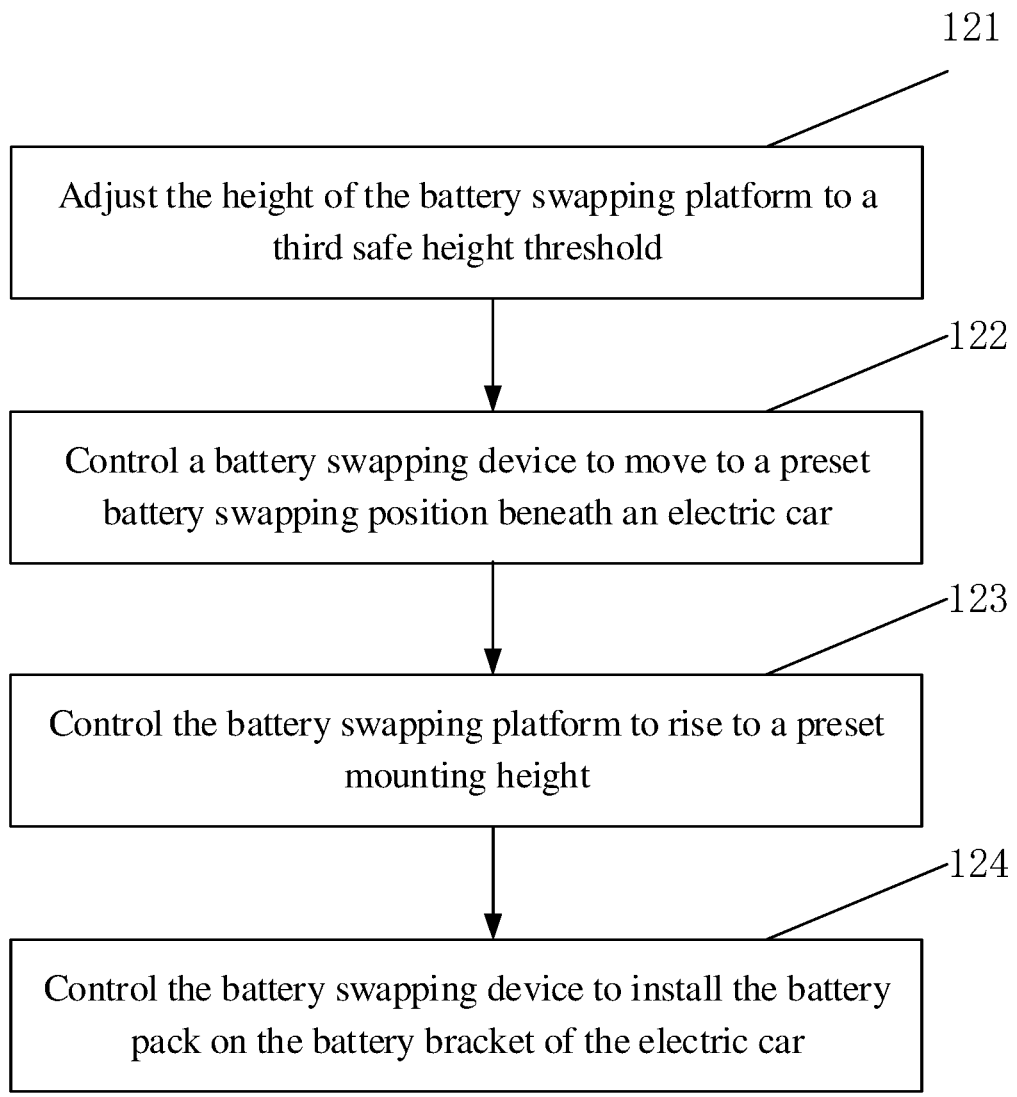
FIG. 15 is a partial flowchart of a battery swapping control method according to embodiment 2 of the present invention.

In the present embodiment, after the step of controlling the battery swapping device to drive to the electric car, the flow of mounting a battery pack is started. As shown in FIG. 15, the battery swapping control method in the present embodiment includes:

step 121, adjusting the height of the battery swapping platform to a third safe height threshold;

step 122, controlling the battery swapping device to move to a preset battery swapping position beneath an electric car;

step 123, controlling the battery swapping platform to rise to a preset mounting height; and step 124, controlling the battery swapping device to install the battery pack on the battery bracket of the electric car.

The height of the battery swapping platform can be adjusted according to the overall height of the battery swapping device and the fully charged battery pack.

The sum of the third safe height threshold and the height of the fully charged battery pack is lower than the height from the lowest part of the chassis of the electric car to the driving plane of the battery swapping device so as to avoid the bottom of the electric car when the battery swapping device carrying the fully charged battery pack moves to be below the electric car. Specifically, in step 121, the current height of the battery swapping platform can be acquired via a distance measuring apparatus mounted to the battery swapping device, and when the acquired current height of the battery swapping platform is not within a third range of a third safe height threshold, the current height of the battery swapping platform is adjusted to the third safe height threshold; when the acquired current height of the battery swapping platform is within a third range of the third safe height threshold, the current height is maintained and step 122 is executed. The third range may be set according to actual requirements, and is not limited herein. In the present embodiment, by adjusting the height of the battery swapping platform to the third safe height threshold and then controlling the battery swapping device to move to be below the electric car, the occurrence of a collision with the bottom of the electric car during the process of the battery swapping device moving to be below the electric car is thus avoided. On the one hand, it can effectively prevent the electric car from being damaged, and on the other hand, it also improves the efficiency of a battery swapping device mounting a battery pack.

In one implementation mode, in order to ensure the safety when the battery swapping device enters the bottom of the electric car, since the battery swapping devices used for taking the battery and mounting the battery may not be the same model of battery swapping devices, before step 122, a step may also be comprised: controlling the battery swapping device to move to the fourth safe telescopic position along the length direction of the electric car so as to avoid front wheels and rear wheels of the electric car when the battery swapping device located at the fourth safe telescopic position enters a preset battery swapping position along the width direction of the electric car. The specific manner of controlling the battery swapping device to move to the fourth safe telescopic position may be specifically referred to the manner of controlling the movement of the battery swapping device to the first safe telescopic position in embodiment 1, which will not be described in detail herein.

In the present embodiment, by controlling the battery swapping device to move to be below the electric car after controlling the battery swapping device to move to the fourth safe telescopic position along the length direction of the electric car, it avoids collisions with the tires of the electric car during the process of different battery swapping devices moving to be below the electric car. Therefore, the battery swapping efficiency is improved while further preventing the electric car body from being damaged.

Since the battery swapping device has been adjusted to the correct battery swapping position when the battery is taken out, i.e. the battery tray 10 for carrying the battery as shown in FIG. 4 has been adjusted to the correct battery swapping position, in particular, the lock shaft of the battery pack placed on the battery tray 10 has been positioned in alignment with the opening 606 of the locking groove. Therefore, in general, by the time when step 122 is completed, the default lock shaft is aligned with the opening 606. However, in a specific implementation mode, the battery swapping device takes out a battery from one end of the electric car, and another battery swapping device enters from the other end to load the battery for the electric car; at this time, it is necessary to further adjust the battery swapping device so as to align the lock shaft with the opening; specifically, a sensor can be provided at the bottom of the electric car, and a detection point is provided on the battery pack; when the sensor detects the detection point, it is considered that the lock shaft is aligned with the opening.

Figure 16:
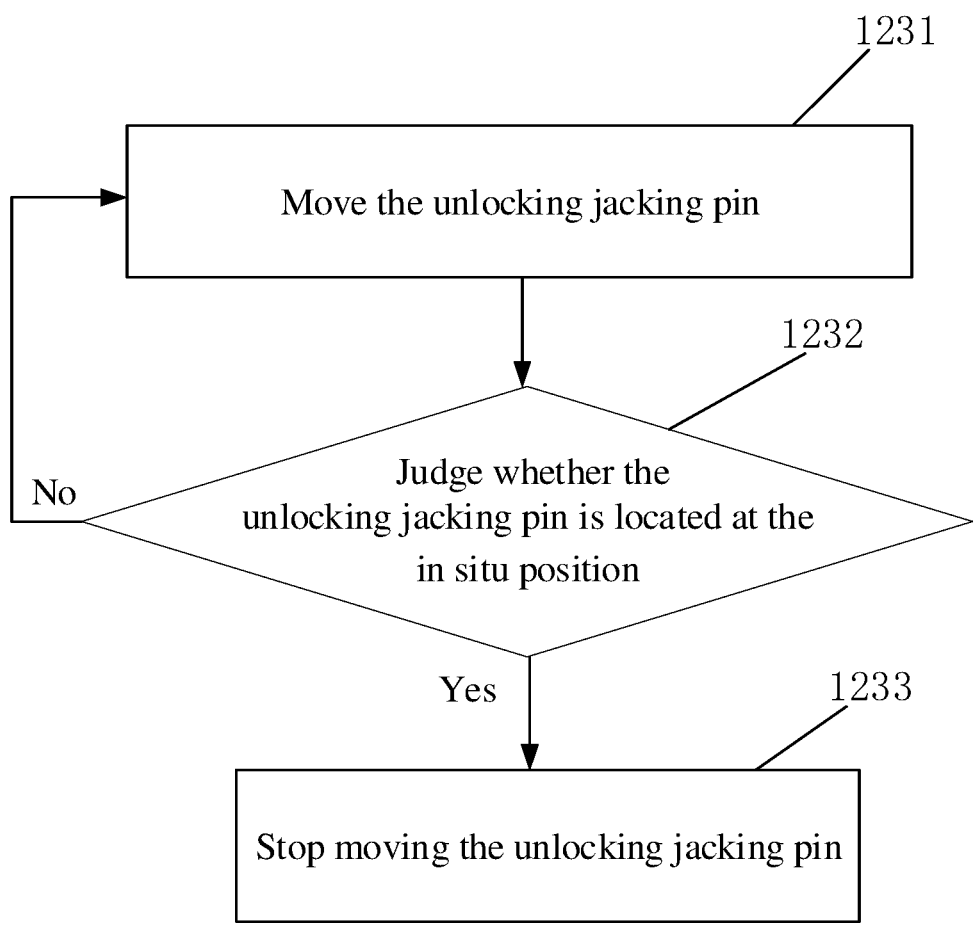
FIG. 16 is a partial flowchart of a battery swapping control method according to embodiment 2 of the present invention.

In the present embodiment, after step 122, the following is further included: the step of adjusting the position of the unlocking jacking pin so as to make the unlocking jacking pin avoid the unlocking piece. Specifically, as shown in FIG. 16, the step includes:

step 1231, moving the unlocking jacking pin;

step 1232, judging whether the unlocking jacking pin is in an in situ position, if yes, executing step 1233, and if no, returning to step 1231; and step 1233, stopping the movement of the unlocking jacking pin.

In the present embodiment, by adjusting the position of the battery swapping device, when the battery swapping device mounts the battery pack, the unlocking jacking pin can be prevented from jacking up the unlocking piece to affect the battery mounting, so that the lock shaft of the battery pack can smoothly enter the opening of the locking groove, and the mounting efficiency of the battery pack is improved. By controlling the unlocking jacking pin to retract, adverse interference with the battery pack mounting process due to the unlocking jacking pin jacking up the lock connecting rod is avoided.

When the battery swapping device has been adjusted to the correct battery swapping position, the insertion piece 70 is aligned with the receiving piece; at this time, step 123 is executed, and step 123 may specifically comprise: controlling the battery swapping platform to rise to a first mounting height at a first speed and controlling the battery swapping platform to rise to a preset mounting height at a second speed, the first speed being greater than the second speed. When the battery swapping platform is located at the first mounting height, the second positioning fork 70 is in contact with the positioning seat of the electric car, and when the battery swapping platform is located at the preset mounting height, the second positioning fork 70 is inserted into the positioning seat and is adhered thereto.

In the present embodiment, when or after the insertion piece is in contact with the receiving piece of the electric car, by reducing the speed, the impact of the insertion piece on the positioning seat can be reduced, thereby not only protecting the insertion piece and the positioning seat, and improving the service life thereof, but also avoiding the influence on other components during the unlocking process.

Figure 17:
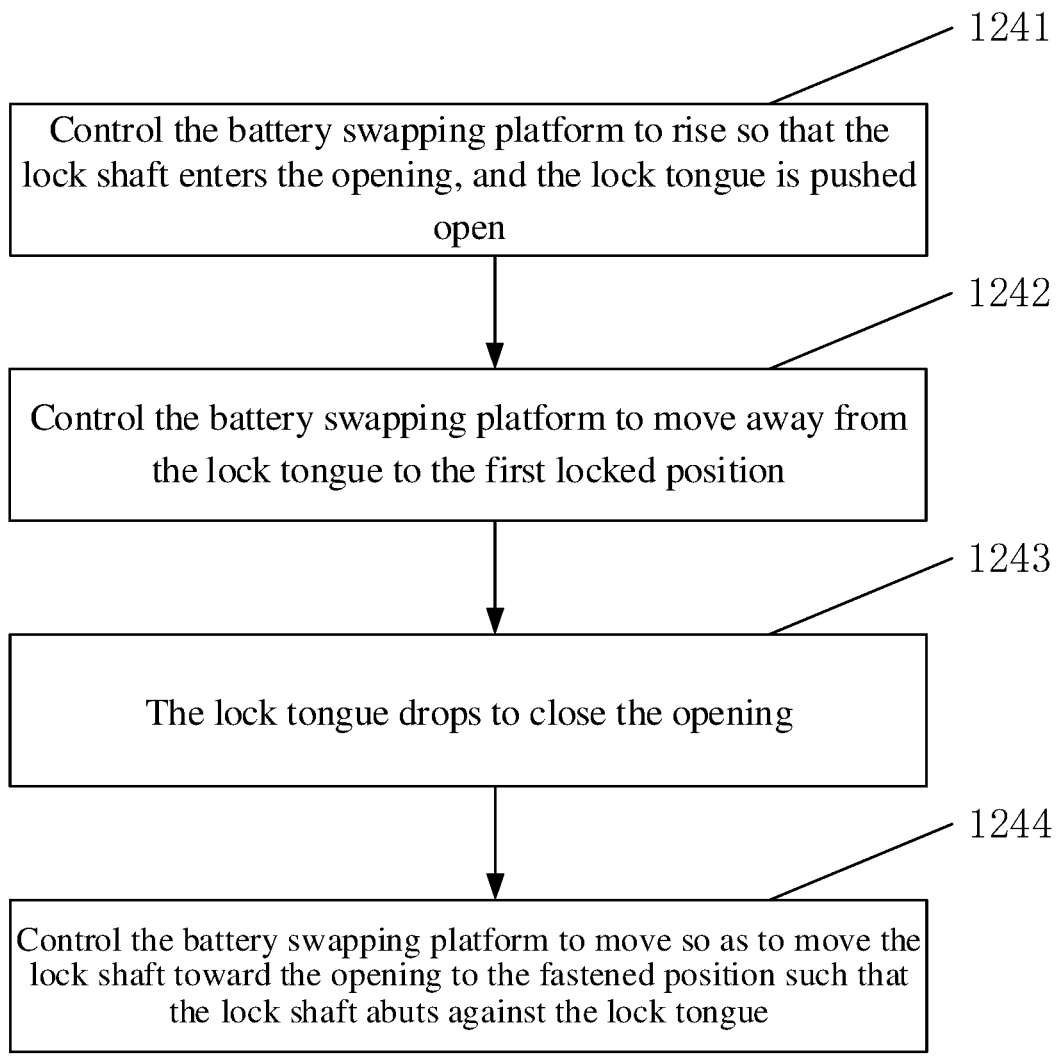
FIG. 17 is a partial flowchart of a battery swapping control method according to embodiment 2 of the present invention.

In order to lock the battery pack during the mounting of the battery pack, as shown in FIG. 17, step 124 specifically includes:

step 1241, controlling the battery swapping platform to rise so that the lock shaft enters the opening, and the lock tongue is pushed open;

step 1242, controlling the battery swapping platform to move away from the lock tongue to a first locked position; and step 1243, the lock tongue dropping to close the opening.

In order to fasten the battery pack and prevent the lock shaft from moving in the locking groove, after step 1243, the following can be further included:

step 1244, controlling the battery swapping platform to move so as to move the lock shaft toward the opening to the fastened position such that the lock shaft abuts against the lock tongue.

As shown in FIGS. 8-11, the elastic member is squeezed when the battery swapping platform is controlled to move in step 1242, and when the lock shaft reaches the first locked position, the locking lock tongue 602 drops to close the opening. After closing the opening, there is a certain movement space of the lock shaft 607 in the locking groove 601, so that a left-right movement may occur. In order to avoid the movement of the lock shaft 607 and fasten the battery pack, the battery swapping platform can be controlled to move in a direction opposite to the movement direction in step 1242 via step 1244 until the lock shaft 607 abuts against the lock tongue 602, and at this time, the lock shaft 607 is squeezed and fixed in the locking groove 601 via the lock tongue 602 and the elastic piece 604.

Specifically, in step 1242, it is possible to determine whether the lock shaft reaches the first locked position by collecting the first image of the locking mechanism; it may be judged in step 1244 whether the lock shaft 607 reaches the fastened position by collecting a second image of the locking mechanism. A visual sensor is provided on the battery swapping device; in step 1242, in the process of controlling the battery swapping platform to move away from the lock tongue 602, the first image comprising a locking mechanism is collected by the visual sensor; whether the lock shaft 607 is located at the first locked position is judged according to a first standard image of the locking mechanism located at the first locked position; if so, the movement of the lock shaft is stopped; and if not, the movement of the lock shaft is continued and the collection of the first image comprising the locking mechanism is continued until the locking mechanism in the collected first image is located at the first locked position. If the locking mechanism image is not judged after the lock shaft 607 moves to the preset position, the control system will give a locking abnormality alarm with graphical and audible prompts. For example, any edge of the lock base in the locking mechanism may be set as a reference edge, and there may be a reference position of the reference edge in the first standard image; if the position of the reference edge in the acquired first image coincides with the reference position of the reference edge in the first standard image, it may indicate that the lock shaft is located at the first locked position, and if they do not coincide, it may indicate that the lock shaft is not located at the first locked position; it should be understood that the above-mentioned setting any edge of the lock base as a reference edge is merely an example to facilitate the description of the present embodiment, and in practice, any point, any side, or any part of the locking mechanism can be used as a reference position to determine whether the lock shaft is in the first locked position.

By the same reasoning, in step 1242, in the process of controlling the movement of the battery swapping platform to move the lock shaft close to the opening, a second image comprising a locking mechanism can be acquired via the visual sensor; according to the second standard image of the locking mechanism located at the fastened position, it is judged whether the lock shaft is located at the fastened position, if so, the movement of the lock shaft is stopped, and if not, the movement of the lock shaft is continued and the acquisition of the second image comprising the locking mechanism is continued until the locking mechanism in the acquired second image is located at the fastened position.

In the present embodiment, the locking of the battery pack can be achieved by controlling the battery swapping platform to move away from the lock tongue, and after the battery pack is locked, the fastening of the battery pack can be achieved by controlling the battery swapping platform to move so as to move the lock shaft close to the opening.

Figure 18:
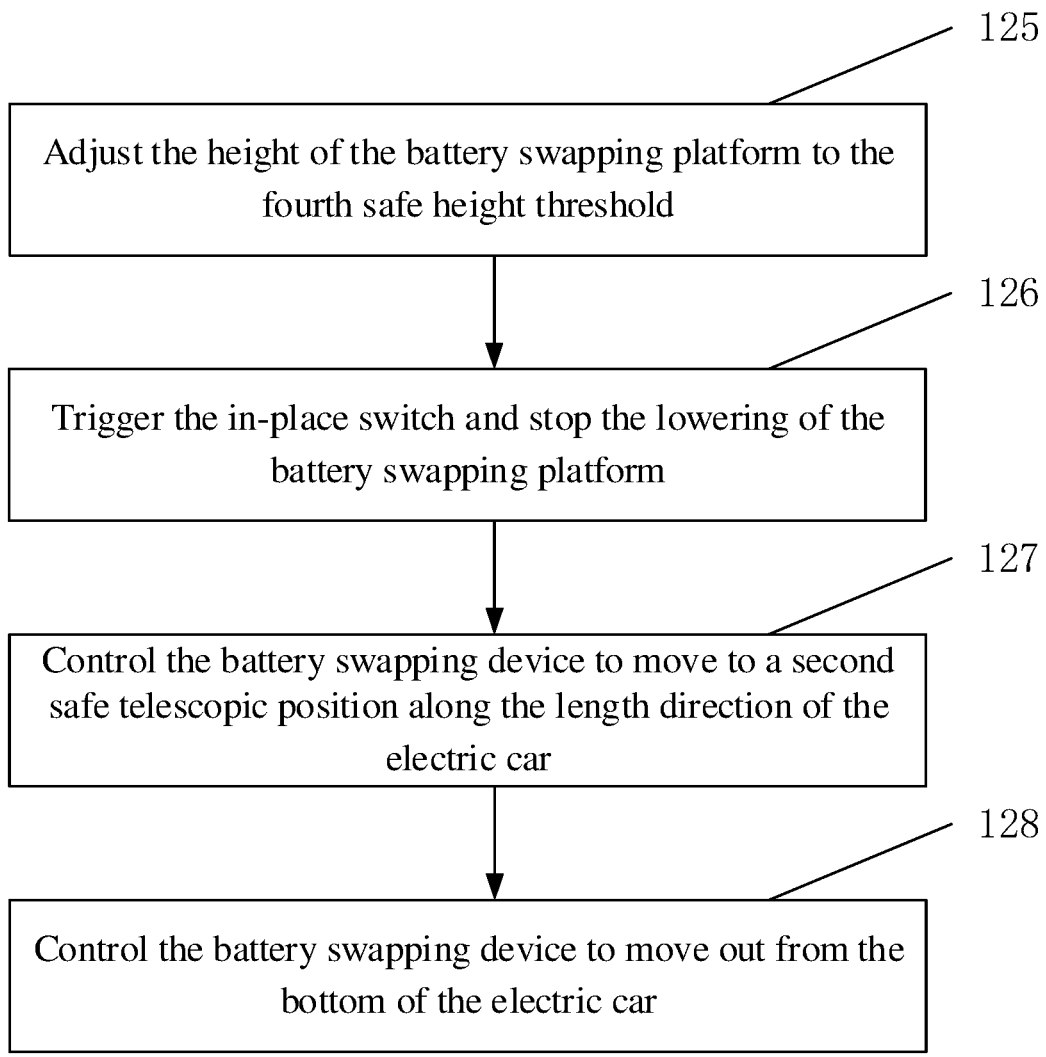
FIG. 18 is a partial flowchart of a battery swapping control method according to embodiment 2 of the present invention.

After fastening the fully charged battery pack, as shown in FIG. 18, the following steps are then executed to take out the battery swapping device from the bottom of the electric car:

step 125, adjusting the height of the battery swapping platform to a fourth safe height threshold;

step 126, triggering the in-place switch to stop the descending of the battery swapping platform;

step 127, controlling the battery swapping device to move to a fifth safe telescopic position along the length direction of the electric car; and step 128, controlling the battery swapping device to be taken out from the bottom of the electric car.

The height of the battery swapping platform can be adjusted according to the overall height of the battery swapping device, and the fourth safe height threshold is lower than the height from the lowest part of the chassis of the electric car to the driving plane of the battery swapping device so as to avoid the bottom of the electric car when the battery swapping device moves to be below the electric car. The specific adjusting manner in step 105 can be made with reference to the description of the height adjustment in step 101 of embodiment 1 and will not be described in detail here.

The specific manner of controlling the battery swapping device to move to the fifth safe telescopic position may be specifically referred to the manner of controlling the movement of the battery swapping device to the first safe telescopic position in embodiment 1, which will not be described in detail herein.

In step 126, by triggering the in-place switch, after the battery swapping platform descends to the fourth safe height threshold, the continuous descent of the battery swapping platform can be avoided, so that the descent time of the battery swapping platform can be reduced, and the overall efficiency of the battery swapping process is improved.

At this point, a series of operations of mounting the battery pack for the electric car have been completed.

According to the battery swapping control method of the present embodiment, on the one hand, in the process of the battery swapping device removing and mounting a battery pack, by adjusting the height of the battery swapping platform, it avoids the scenario that the battery swapping device collides with the electric car in the process of entering and exiting from the bottom of the electric car; on the other hand, by the pre-pushing process, the efficiency of removing the battery pack can be improved, and by controlling the movement of the lock shaft from the locked position to the fastened position, the fixing of the battery pack is realized, thereby improving the efficiency and effectiveness of mounting the battery pack. Therefore, overall, the battery swapping time of the electric car is saved and the battery swapping efficiency is improved, and the cooperative control between the battery swapping device and the battery pack transfer apparatus is realized, so that the transfer time of the battery pack from the battery swapping device to the electric car and the transfer time of the battery pack from the battery transfer apparatus to the battery swapping device is saved, and the transfer efficiency of the battery pack is improved.

Embodiment 3

Figure 19:
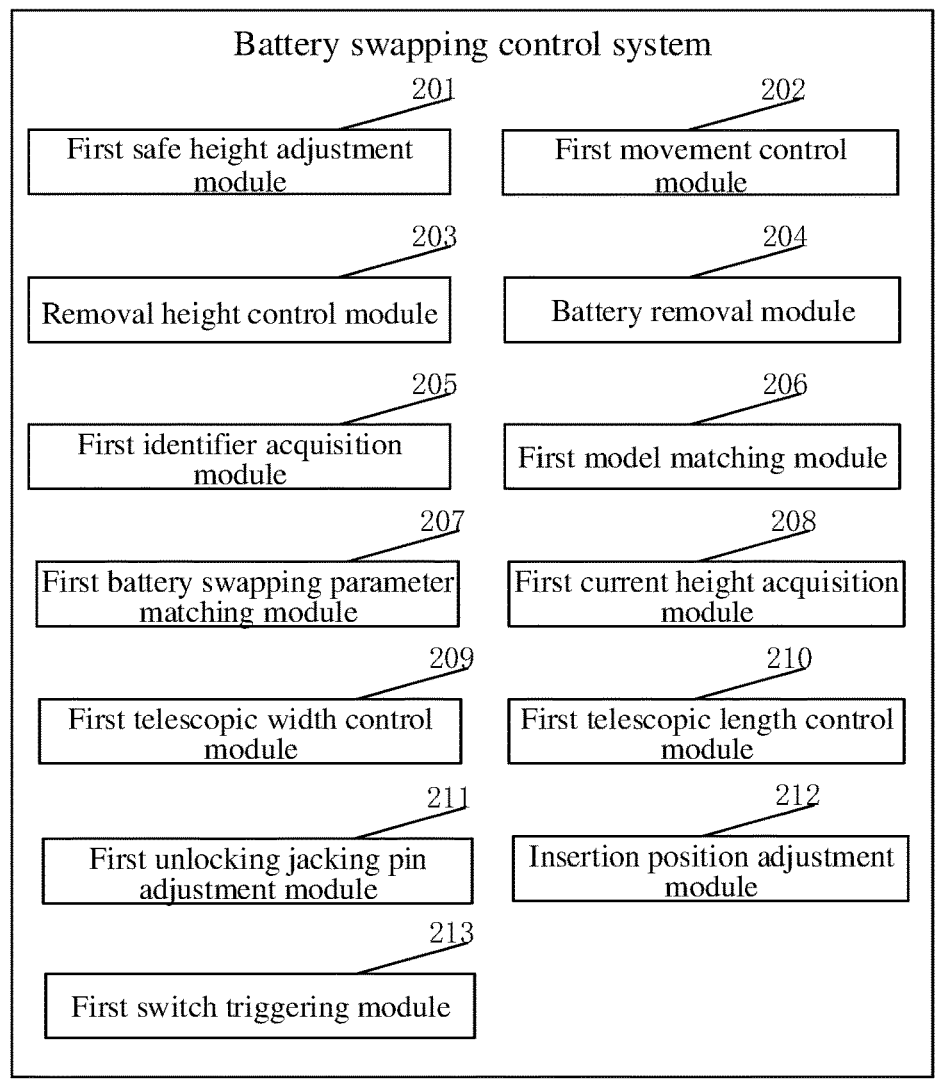
FIG. 19 is a schematic diagram of a module of a battery swapping control system according to embodiment 3 of the present invention.

The present embodiment provides a battery swapping control system, as shown in FIG. 19, including: a first safe height adjustment module 201, a first movement control module 202, a removal height control module 203, and a battery removal module 204. The first movement control module 202 is used for controlling the battery swapping device to move to a preset battery swapping position below the electric car, the removal height control module 203 is used for controlling the battery swapping platform to rise to a preset removal height, the battery removal module 204 is used for controlling the battery swapping device to remove the battery pack from the bottom of the electric car, and the first safe height adjustment module 201 is used for adjusting the height of the battery swapping platform to a first safe height threshold, the first safe height threshold being lower than the height from the lowest part of the chassis of the electric car to the driving plane of the battery swapping device.

The first safe height adjustment module 201 can adjust the height of the battery swapping platform according to the overall height of the battery swapping device; since there may be differences in the distance from the bottom of different models of electric cars to the driving plane of the electric car, the present embodiment may further comprise a first identifier acquisition module 205, a first model matching module 206, and a first battery swapping parameter matching module 207; the first identifier acquisition module 205 is used for acquiring an identifier of the electric car after the electric car enters the battery swapping station; the first model matching module 206 is used for matching the model of the electric car according to the identifier, and the first battery swapping parameter matching module 207 is used for matching a corresponding battery swapping parameter according to the model of the electric car; the battery swapping parameter comprises at least one of the first safe height threshold, the second safe height threshold, the first safe telescopic position, the second safe telescopic position, and the third safe telescopic position.

In the present embodiment, the first safe height adjustment module 201 can acquire a corresponding first safe height threshold according to electric cars of different models via the first battery swapping parameter matching module 207; specifically, the battery swapping station stores in the background a corresponding relationship between an identifier (such as a license plate) of an electric car and the model of the electric car, and the corresponding relationship between the model of the electric car and the first safe height threshold; when the electric car enters the battery swapping station, the identifier of the electric car can be acquired, and according to the data stored in the background, the model of the electric car corresponding to the identifier can be matched, and the first safe height threshold corresponding to the model of the electric car can be matched.

It should be understood that the background of the battery swapping station also stores the corresponding relationship between the model of the electric car and other parameters, including the second safe height threshold, the first safe telescopic position, the second safe telescopic position, the third safe telescopic position, etc.; accordingly, the above-mentioned various parameters can all be obtained by means of the first identifier acquisition module 205, the first model matching module 206, and the first battery swapping parameter matching module 207 according to the model of the electric car when the electric car enters the battery swapping station or after the electric car enters the battery swapping station.

In the present embodiment, the first safe height threshold is lower than the height from the lowest part of the chassis of the electric car to the driving plane of the battery swapping device, so that when the battery swapping device moves below the electric car or when the electric car moves above the battery swapping device, the battery swapping device avoids the bottom of the electric car. The battery swapping control system in the present embodiment may further comprise a first current height acquisition module 208; specifically, a distance measuring apparatus is provided on the battery swapping platform, the first current height acquisition module 208 may acquire the current height of the battery swapping platform via the distance measuring apparatus, and when the acquired current height of the battery swapping platform is not at the first safe height threshold, the first safe height adjustment module 201 adjusts the current height of the battery swapping platform to the first safe height threshold; the first current height acquisition module 208 may invoke the first movement control module 202 when the acquired current height of the battery swapping platform is within the first range of the first safe height threshold. Here, the first range may be set according to actual requirements, and it is not limited herein.

In the present embodiment, after the height of the battery swapping platform is adjusted to the first safe height threshold by the first safe height adjustment module 201, and the battery swapping device is controlled to move to be below the electric car by the first movement control module 202, such that the situation that the battery swapping device collides with the bottom of the electric car during the process that the battery swapping device moves to be below the electric car or the electric car moves to be above the battery swapping device is avoided. On the one hand, it can effectively prevent the electric car from being damaged, and on the other hand, it also improves the efficiency of removing a battery pack from a battery swapping device.

In order to further ensure the safety of the battery swapping process, in one case, when the battery swapping device first drives to a preset battery swapping position, and the electric car then enters the stationary vehicle-carrying platform 7 (as shown in FIG. 2), and in order to ensure that when the electric car enters the vehicle-carrying platform, the wheel can drive over the battery swapping device while avoiding the wheel from getting into the space between the stationary vehicle-carrying platforms 7. The control system further includes: a first telescopic width control module 209 used for judging whether the battery swapping device is located within the first telescopic range of the first safe telescopic position; and if yes, maintaining the current position, and if no, controlling the battery swapping device to move to the first safe telescopic position along the width direction of the electric car so that the wheels are located within a preset parking range of the battery swapping site when the electric car moves to the battery swapping site.

The preset parking range is a position between a preset first positioning mechanism (such as a first roller) on the vehicle-carrying platform and a preset second positioning mechanism (such as a second roller) on the battery swapping device, the first safe telescopic position being a position along the width direction of the electric car. When the first telescopic width control module 209 controls the electric car to move to the first safe telescopic position, the control can be performed according to a pre-calibrated position. Specifically, a certain specific position can be calibrated to be an original position (such as a position when a battery swapping small car sets off); since when the electric car enters a battery swapping station, the first safe telescopic position of the electric car has been acquired according to the model of the electric car, and when the motor controls the battery swapping device to move, since the distance that the battery swapping device is controlled to move by every rotation of the driving shaft of the motor is fixed, the actual moving distance of the battery swapping device can be known according to the number of rotations of the motor in the actual operation process. By judging whether the actual moving distance of the electric car matches the first safe telescopic position acquired from the background, whether the battery swapping device is located at the first safe telescopic position can be monitored in real time.

In the present embodiment, with regard to the first telescopic width control module 209, by controlling the battery swapping device to move to the first safe telescopic position, on the one hand, it is possible to avoid the situation that the battery swapping device is not stopped in place which would otherwise cause the wheels fall into the crack of the vehicle-carrying platform when the electric car drives to the vehicle-carrying platform and thus affect the efficiency of battery swapping; on the other hand, it is also possible to avoid that the battery swapping device is stopped too far which would otherwise make it difficult for the battery swapping device to replace the battery for the electric car.

In another case, when the electric car first enters the liftable vehicle-carrying platform 8 and the battery swapping device then enters a preset battery swapping position (as shown in FIG. 3), in order to ensure that front wheels and rear wheels of the electric car are not touched when the battery swapping device enters the bottom of the electric car, the control system further includes: a first telescopic length control module 210 used for judging whether the battery swapping device is located in a second telescopic range of the second safe telescopic position; and if so, maintaining the current position, and if not, controlling the battery swapping device to move to the first safe telescopic position along the length direction of the electric car so as to avoid front wheels and rear wheels of the electric car when the battery swapping device located at the first safe telescopic position enters a preset battery swapping position along the width direction of the electric car.

It should be understood that the second safe telescopic position is a position along the length direction of the electric car between front wheels and rear wheels of the electric car. The specific manner of controlling the battery swapping device to move the second safe telescopic position is consistent with the above-mentioned specific manner of controlling the battery swapping device to move to the first safe telescopic position, which will not be described in detail herein.

In the present embodiment, the first telescopic length control module 210 controls the movement of the battery swapping device along the length direction of the electric car to the second safe telescopic position, and then the first movement control module 202 controls the battery swapping device to move to be below the electric car to avoid collisions with the tires of the electric car during the process of the battery swapping device moving to be below the electric car. Therefore, the battery swapping efficiency is improved while further preventing the electric car body from being damaged.

In the present embodiment, with regard to the first movement control module 202, after the battery swapping device is located at the preset battery swapping position, in order to further ensure that the battery swapping device is at the correct battery swapping position, the position of the battery swapping device can also be further adjusted, for example, it being possible to provide a visual sensor on the battery swapping device such that a photo of the bottom of the electric car can be taken in real time via the visual sensor, and a certain position can be determined at the bottom of the electric car as a reference position (such as the edge of a lock base). By judging whether the reference position in the real-time captured photo matches the reference position in the standard reference photo, whether the battery swapping device is aligned with the battery pack is judged.

In the present embodiment, the battery swapping control system may further include a first unlocking jacking pin adjustment module 211 for adjusting the position of the unlocking jacking pin to align the unlocking jacking pin with the unlocking piece after the battery swapping device is located at the correct battery swapping position so that the unlocking of the battery pack can be achieved. Since the battery pack to be removed is mounted to the battery bracket, the battery bracket comprises a locking mechanism, and the battery pack is mounted to the battery bracket via the locking mechanism, as shown in FIGS. 8-11, the unlocking piece 701 is acted on by the unlocking jacking pin 333 to drive the locking mechanism to switch from the locking state (FIG. 9) to the unlocking state (FIG. 11) so as to unlock the battery pack from the battery bracket, and then the battery pack is driven to move by the battery swapping device so that the lock shaft 607 of the battery pack is disengaged from the locking mechanism, thereby completing the removal of the battery pack. The unlocking jacking pin 333 is movably arranged on the battery swapping device, and the battery swapping device is provided with an unlocked position and an in situ position; when the unlocking jacking pin 333 is located at the unlocked position, the unlocking jacking pin 333 is aligned with the unlocking piece 701; when the unlocking jacking pin 333 is located at the in situ position, the unlocking jacking pin 333 avoids the unlocking piece 701.

Specifically, the first unlocking jacking pin adjustment module 211 is specifically used for moving the unlocking jacking pin and judging whether the unlocking jacking pin is located at the unlocked position, and if not, continuing to move the unlocking jacking pin, and if so, stopping moving the unlocking jacking pin. The first unlocking jacking pin adjustment module 211 is specifically used for determining that the unlocking jacking pin is located at the unlocked position when the detection point is located in the detection area of the detection sensor, and then the unlocking jacking pin is located at the in situ position when the detection point is located in the detection area of a detection sensor for detecting the in situ position.

As shown in FIG. 6, in one mode, the first sensor 335 and the second sensor 336 are provided on the battery swapping device. The first sensor 335 is used for detecting whether the unlocking jacking pin 333 reaches the unlocked position, and the second sensor 336 is used for detecting whether the unlocking jacking pin 333 reaches the in situ position; and in one mode, in a specific implementation, a detection point may be provided on the unlocking jacking pin, and the first unlocking jacking pin adjustment module 211 is used for determining that the unlocking jacking pin is located at the unlocked position when the detection point is located in a detection area of the detection sensor.

The first unlocking jacking pin adjustment module 211 judges whether the unlocking jacking pin is located in an unlocked position or an in situ position by judging whether the detection point is located in the detection area of the detection sensor; the unlocking jacking pin 333 may also not be provided with a detection point; in this case, the model of the sensor is a proximity sensor; specifically, during the sliding of the sliding block 337, the unlocking jacking pin 333 will gradually approach the first sensor 335 or the second sensor 336; when the distance from the unlocking jacking pin 333 to a certain sensor is less than a preset distance, the corresponding sensor will detect the unlocking jacking pin 333; at this moment, the sliding of the sliding block 337 stops, and it is confirmed that the unlocking jacking pin 333 is located at the unlocked position or the original position.

In another implementation mode, it is also possible to provide a detection point on the battery swapping device and a detection sensor on the unlocking jacking pin. The first unlocking jacking pin adjustment module 211 can accurately and effectively judge whether the unlocking jacking pin is in the unlocked position or the in situ position via the detection of the detection point by the detection sensor.

In the present embodiment, with regard to the first unlocking jacking pin adjustment module 211, by adjusting the position and attitude of the unlocking jacking pin, the unlocking jacking pin can be located in the unlocked position when the battery swapping device is unlocking, thereby improving the accuracy of the unlocking process.

As shown in FIGS. 4 and 5, in the present embodiment, the battery swapping device comprises a battery tray 10 and a lower frame 11, and two sides of the lower frame 11 are respectively provided with a second positioning fork 70 for forking the battery swapping car so as to be fixed relative to the battery swapping car. The battery tray 10 is provided on the battery swapping platform and moves along with the battery swapping platform. The first positioning fork 30 is provided on the side edge of the battery tray 10, and the second positioning fork 70 is provided on the side edge of the lower frame 11. The first positioning fork 30 and the second positioning fork 70 both have a groove with an opening facing upwards, respectively used for inserting and clamping a positioning block (such as a lock shaft) on the battery pack and a positioning seat (such as a lock base) on the battery bracket. With regard to the battery removal module 204, by clamping the first positioning fork 30 into the positioning block and the second positioning fork 70 into the positioning seat, the lower frame 11 can be fixed when the battery swapping platform moves, and the battery tray 10 can be moved to take out the battery pack.

In the present embodiment, the battery swapping control system may further include an insertion position adjustment module 212 for adjusting the position of the battery swapping platform along the length direction of the electric car to move the insertion piece to a preset insertion position, the preset insertion position being aligned with the preset receiving position. It should be understood that the insertion piece here comprises a first positioning fork 30 and a second positioning fork 70, where the receiving position is the positioning block or positioning seat previously described. Specifically, the battery swapping device may comprise a visual sensor, and a preset detection position (such as an edge of the insertion piece) may be provided on the insertion piece. The insertion position adjustment module 212 can control the visual sensor to shoot the bottom of the electric car to form a detection photo, and determine whether the preset detection position in the detection photo is consistent with the position of the preset detection position in a standard photo (a photo taken when the insertion piece is at the preset insertion position), and if not, the position of the battery swapping device is adjusted along the length direction of the electric car.

In the present embodiment, the removal height control module 203 comprises a first speed control unit and a second speed control unit. After the insertion position adjustment module 212 controls the insertion piece to move to a preset insertion position, specifically, the first speed control unit is used for controlling the battery swapping platform to rise to the first removal height at the first speed, and the second speed control unit is used for controlling the battery swapping platform to rise to a preset removal height at the second speed, the first speed being greater than the second speed. When the battery swapping platform is located at the first removal height, the first insertion piece 30 is in contact with the positioning block on the battery pack, and the second insertion piece 70 is in contact with the positioning seat on the battery bracket; when the battery swapping platform is located at the preset removal height, the first insertion piece 30 is inserted into the positioning block on the battery pack and is completely fitted with the same, and the second insertion piece 70 is inserted into the positioning seat on the battery bracket and is completely fitted with the same.

In the present embodiment, the impact of the insertion piece on the positioning block or the positioning seat can be reduced by the second speed control unit by reducing the speed after the insertion piece contacts the positioning block or the positioning seat, thereby not only protecting the receiving piece, the positioning block, and the positioning seat, and improving the service life, but also avoiding the influence on other components during the unlocking process.

Figure 20:
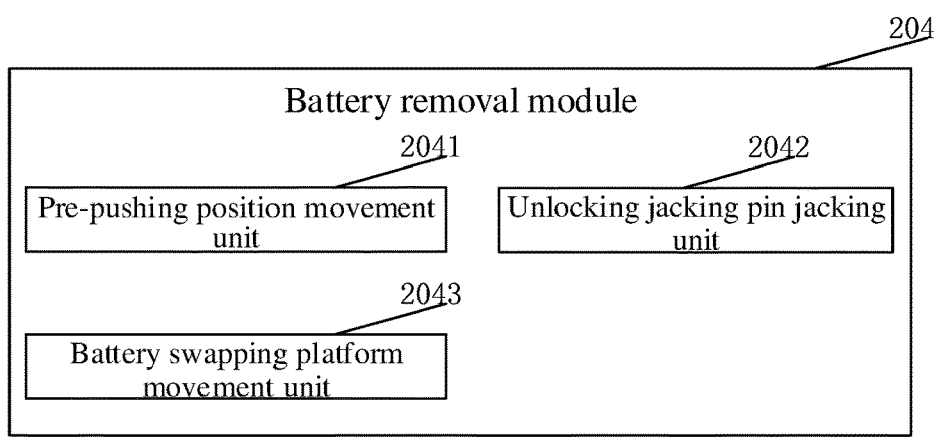
FIG. 20 is a schematic diagram of a module of a battery removal module according to embodiment 3.

In order to prevent the lock shaft 607 of the battery pack from being caught in the locking groove 601 due to the putting down state of the lock tongue 602 in the locked state during the removal of the battery pack, as shown in FIG. 20, the battery removal module 204 may specifically include: a pre-pushing position movement unit 2041 so that the lock tongue 602 may make a certain space for the locking groove 601 to allow the lock shaft to move out of the locking groove 601. Specifically, the pre-pushing position movement unit 2041 is used for controlling the battery swapping platform to move such that the lock shaft of the battery pack moves away from the lock tongue to an unlocking pre-pushing position.

The battery removal module 204 may further comprise an unlocking jacking pin jacking unit 2042 and a battery swapping platform movement unit 2043. The pre-pushing position movement unit 2041 is used for invoking the unlocking jacking pin jacking unit 2042, the unlocking jacking pin jacking unit 2042 is used for controlling the unlocking jacking pin to jack up an unlocking point of the battery swapping device so as to drive the lock tongue to be away from the locking groove, and the battery swapping platform movement unit 2043 is used for controlling the battery swapping platform to move so that the lock shaft of the battery pack moves in the direction close to the opening of the locking groove to be at the unlocked position so as to make the battery pack separate from the battery bracket and fall onto the battery swapping device.

After the battery swapping platform rises to the preset removal height, since the lock tongue 602 blocks the opening 606 from which the lock shaft 607 enters and exits the locking groove 601, the lock tongue 602 needs to be further rotated upwards so as to open the opening 606, and the lock shaft 607 located in the locking groove 601 restricts the rotating upwards of the lock tongue 602; therefore, the lock shaft 607 needs to move away from the lock tongue 602 so as to relieve the restriction on the rotation of the lock tongue 602; when the lock shaft 607 is located at the unlocking pre-pushing position, the lock tongue can rotate upwards relative to the lock base 600 so as to open the opening 606 of the locking groove 601. The pre-pushing position movement unit 2041 controls the battery swapping platform to move so as to make room for the movement of the lock tongue 602 in the locking groove 601; since the unlocking point 701 is subjected to the jacking-up force by the unlocking jacking pin 333, the lock tongue 602 is moved upwards driven by the locking connecting rod 700 so as to open the opening from which the lock shaft is in and out of the locking groove, so that the lock shaft 607 can leave the locking groove 601 from the opening 606. Then, the battery swapping platform is controlled via the battery swapping platform movement unit 2043 to move in a control direction opposite to the pre-pushing position movement unit 2041 to be at the unlocked position. Then, the safe height adjustment module is used to control the battery swapping platform to vertically descend, causing the lock shaft 607 of the battery pack to disengage from the locking mechanism, thus completing the removal of the battery pack from the electric car.

In addition, an in-place switch is provided on the lifting mechanism of the battery swapping platform in the present embodiment. The battery swapping control system in the present embodiment further comprises: the first switch triggering module 213 used for triggering an in-place switch to stop the descending of the battery swapping platform when the height of the battery swapping platform drops to the second safe height threshold after the battery pack drops on the battery swapping device, and invoking the first telescopic length control module 210, wherein the first telescopic length control module 210 controls the battery swapping device to move to the third safe telescopic position along the length direction of the electric car, and invokes the first unlocking jacking pin adjustment module 211 to adjust the unlocking jacking pin to the in situ position, and then the first unlocking jacking pin adjustment module 211 invokes the first movement control module 202 to control the battery swapping device to move out from the bottom of the electric car.

In the present embodiment, the removal height control module 203 may adjust the height of the battery swapping platform according to the overall height of the battery swapping device and the battery pack having power loss. The sum of the second safe height threshold and the height of the battery pack having power loss is lower than the height from the lowest part of the chassis of the electric car to the driving plane of the battery swapping device so as to avoid the bottom of the electric car when the battery swapping device carrying the battery pack having power loss moves to be below the electric car. Specifically, the manner in which the removal height control module 203 adjusts the height of the battery swapping platform can be referred to the aforementioned manner in which the removal height control module 203 adjusts the height of the battery swapping platform, which will not be described in detail herein. The second range may be set according to actual requirements, and this is not limited herein.

Since the width of the battery pack may be greater than the width of the battery swapping device, before controlling the battery swapping device to move out of the bottom of the electric car, the first telescopic width control module 209 needs to first control the battery swapping device to move to a third safe telescopic position along the length direction of the electric car so that the battery swapping device carrying the battery pack with power loss avoids front wheels and rear wheels of the electric car when moving out. The specific manner in which the first telescopic width control module 209 controls the battery swapping device to move to the third safe telescopic position may be referred to the aforementioned manner in which the first telescopic width control module 209 controls the battery swapping device to move the first safe telescopic position, and the description thereof will not be repeated herein.

In the present embodiment, after the first safe height adjustment module 201 adjusts the height of the battery swapping platform to the second safe height threshold, the first telescopic length control module 210 adjusts the battery swapping device to move to the third safe telescopic position, and then the battery swapping device is controlled to move out from below the electric car, so as to avoid the situation of the collision with the bottom of the electric car or the wheels of the electric car during the process of the battery swapping device moving out from below the electric car. On the one hand, the electric car can be effectively prevented from being damaged, and on the other hand, the efficiency of the battery swapping device for removing the battery pack is also improved.

By triggering the in-place switch by the first switch triggering module 213, after the battery swapping platform descends to the second safe height threshold, the continuous descent of the battery swapping platform can be avoided, so that the descent time of the battery swapping platform can be reduced, and the overall efficiency of the battery swapping process is improved.

At this point, a series of operations of removing the battery pack for the electric car have been completed.

In the present embodiment, after the battery swapping device is removed from the bottom of the electric car, the battery swapping device continues to be controlled to move to the battery rack. The battery rack comprises at least a first region and a second region; the first region is used for placing a fully charged battery pack, and the second region is used for placing a battery pack with power loss; in the present embodiment, the following steps are performed: controlling the battery swapping device to place the battery pack with power loss to the first region on the battery rack and removing the fully charged battery pack from the second region, and controlling the battery swapping device carrying the fully charged battery pack to drive to the electric car, or controlling the battery swapping device to move to a stacker crane, placing the battery pack with power loss on the stacker crane, and taking out the fully charged battery pack from the stacker crane.

In another implementation mode, after the battery swapping device is removed from the bottom of the electric car, another battery swapping device carrying a fully charged battery pack may also be controlled to drive to the electric car.

Embodiment 4

Figure 21:
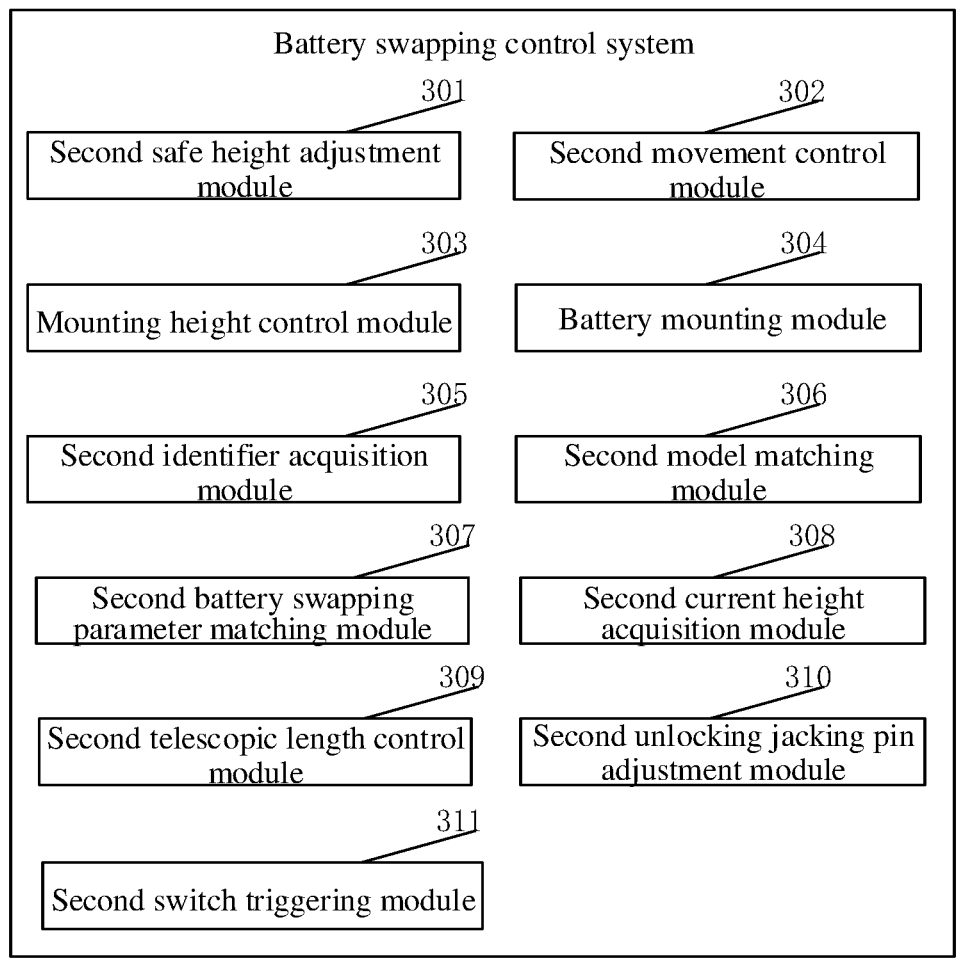
FIG. 21 is a schematic diagram of a module of a battery swapping control system according to embodiment 4 of the present invention.

In the present embodiment, after controlling the battery swapping device to drive towards the electric car, the mounting of a battery pack begins. As shown in FIG. 21, the battery swapping control system in the present embodiment includes: a second safe height adjustment module 301, a second movement control module 302, a mounting height control module 303, and a battery mounting module 304.

The second safe height adjustment module 301 is used for adjusting the height of the battery swapping platform to the third safe height threshold, the sum of the third safe height threshold and the height of the battery pack is lower than the height from the lowest part of the chassis of the electric car to the driving plane of the battery swapping device, the second movement control module 302 is used for controlling the battery swapping device to move to a preset battery swapping position below the electric car, the mounting height control module 303 is used for controlling the battery swapping platform to rise to a preset mounting height, and the battery mounting module 304 is used for controlling the battery swapping device to install the battery pack on the battery bracket of the electric car.

The height of the battery swapping platform can be adjusted according to the overall height of the battery swapping device and the fully charged battery pack.

The present embodiment may further comprise a second identifier acquisition module 305, a second model matching module 306, and a second battery swapping parameter matching module 307. The second identifier acquisition module 305 is used for acquiring an identifier of an electric car after the electric car enters a battery swapping station, the second model matching module 306 is used for matching the model of the electric car according to the identifier, the second battery swapping parameter matching module 307 is used for matching a corresponding battery swapping parameter according to the model of the electric car, and the battery swapping parameter comprises at least one of the third safe height threshold, the fourth safe height threshold, the fourth safe telescopic position, and the fifth safe telescopic position.

The sum of the third safe height threshold and the height of the fully charged battery pack is lower than the height from the lowest part of the chassis of the electric car to the driving plane of the battery swapping device so as to avoid the bottom of the electric car when the battery swapping device carrying the fully charged battery pack moves to be below the electric car. Specifically, the battery swapping control system further comprises: a second current height acquisition module 308 which can be used for acquiring the current height of a battery swapping platform via a distance measuring apparatus mounted to the battery swapping device. When the acquired current height of the battery swapping platform is not within a third range of the third safe height threshold, a second safe height adjustment module 301 adjusts the current height of the battery swapping platform to the third safe height threshold; the second current height acquisition module 308 maintains the current height and invokes the second movement control module 302 when the acquired current height of the battery swapping platform is within a third range of the third safe height threshold. The third range may be set according to actual requirements, and is not limited herein. In the present embodiment, the second safe height adjustment module 301 adjusts the height of the battery swapping platform to the third safe height threshold and then the second movement control module 302 controls the battery swapping device to move to be below the electric car, and the occurrence of a collision with the bottom of the electric car during the process of the battery swapping device moving to be below the electric car is thus avoided. On the one hand, it can effectively prevent the electric car from being damaged, and on the other hand, it also improves the efficiency of a battery swapping device mounting a battery pack.

In one implementation mode, in order to ensure safety when the battery swapping device enters the bottom of the electric car, since the battery swapping devices used for taking the battery and mounting the battery may not be the same model of battery swapping devices, the battery swapping control system further includes a second telescopic length control module 309 for controlling the battery swapping device to move to the fourth safe telescopic position along the length direction of the electric car so as to avoid front wheels and rear wheels of the electric car when the battery swapping device located at the fourth safe telescopic position enters a preset battery swapping position along the width direction of the electric car. The specific manner in which the second telescopic length control module 309 controls the movement of the battery swapping device to the fourth safe telescopic position can be referred to the manner in which the first telescopic length control module 210 controls the movement of the battery swapping device to the first safe telescopic position in embodiment 3, and this will not be repeated herein.

In the present embodiment, by controlling the battery swapping device to move to be below the electric car after controlling the battery swapping device to move to the fourth safe telescopic position along the length direction of the electric car, the second telescopic length control module 309 avoids collisions with the tires of the electric car during the process of different battery swapping devices moving to be below the electric car. Therefore, the battery swapping efficiency is improved while further preventing the electric car body from being damaged.

Since the battery swapping device has been adjusted to the correct battery swapping position when the battery is taken out, i.e. the battery tray 10 for carrying the battery as shown in FIG. 4 has been adjusted to the correct battery swapping position, in particular, the lock shaft of the battery pack placed on the battery tray 10 has been positioned in alignment with the opening 606 of the locking groove. Therefore, in general, when the second movement control module 302 controls the battery swapping device to move to the preset battery swapping position below the electric car, the default lock shaft is aligned with the opening 606. However, in a specific implementation mode, the battery swapping device takes out a battery from one end of the electric car, and another battery swapping device enters from the other end to load the battery for the electric car; at this time, it is necessary to further adjust the battery swapping device so as to align the lock shaft with the opening; specifically, a sensor can be provided at the bottom of the electric car, and a detection point is provided on the battery pack; when the sensor detects the detection point, it is considered that the lock shaft is aligned with the opening.

In the present embodiment, the battery swapping control system further comprises a second unlocking jacking pin adjustment module 310 for adjusting the position of the unlocking jacking pin so as to enable the unlocking jacking pin to avoid the unlocking point on the locking mechanism; specifically, the second unlocking jacking pin adjustment module 310 is used for moving the unlocking jacking pin and judging whether the unlocking jacking pin is located at the in situ position, if so, stopping moving the unlocking jacking pin, and if not, continuing to move the unlocking jacking pin until the unlocking jacking pin is located at the in situ position.

In the present embodiment, by adjusting the position of the battery swapping device by the second unlocking jacking pin adjustment module 310, when the battery swapping device mounts the battery pack, the unlocking jacking pin can be prevented from jacking up the unlocking piece to affect the battery mounting, so that the lock shaft of the battery pack can smoothly enter the opening of the locking groove, and the mounting efficiency of the battery pack is improved. By controlling the unlocking jacking pin to retract, adverse interference with the battery pack mounting process due to the unlocking jacking pin jacking up the lock connecting rod is avoided.

In the present embodiment, the mounting height control module 303 specifically comprises a third speed control unit and a fourth speed control unit; when the battery swapping device has been adjusted to the correct battery swapping position, the insertion piece 70 is aligned with the receiving piece; at this moment, the third speed control unit controls the battery swapping platform to rise to the first mounting height at the first speed, and the fourth speed control unit controls the battery swapping platform to rise to a preset mounting height at the second speed, the first speed being greater than the second speed. When the battery swapping platform is located at the first mounting height, the second positioning fork 70 is in contact with the positioning seat of the battery bracket, and when the battery swapping platform is located at the preset mounting height, the second positioning fork 70 is inserted into the positioning seat and is adhered thereto.

In the present embodiment, when or after the insertion piece is in contact with the receiving piece of the electric car, by reducing the speed, the fourth speed control unit can reduce the impact of the insertion piece on the positioning seat, thereby not only protecting the insertion piece and the positioning seat, and improving the service life thereof, but also avoiding the influence on other components during the unlocking process.

Figure 22:
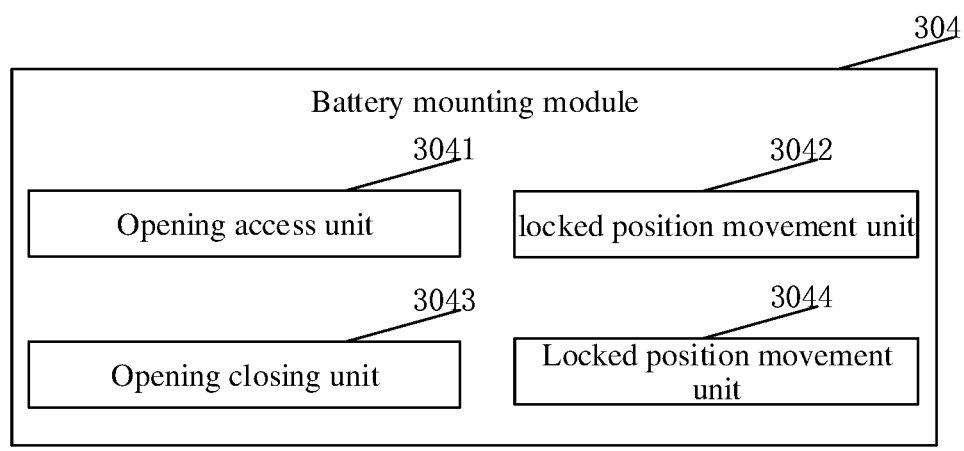
FIG. 22 is a schematic diagram of a module of a battery mounting module in embodiment 4.

In order to lock the battery pack during the mounting of the battery pack, as shown in FIG. 22, the battery mounting module 304 may specifically include: an opening access unit 3041, a locked position movement unit 3042, and an opening closing unit 3043. The opening access unit 3041 is used for controlling the battery swapping platform to rise so as to allow the lock shaft to enter the opening and push open the lock tongue, the locked position movement unit 3042 is used for controlling the battery swapping platform to move in a direction away from the lock tongue to the first locked position, and the opening closing unit 3043 is used for controlling the lock tongue to fall so as to close the opening.

In order to fasten the battery pack to prevent the lock shaft from moving in the locking groove, the battery mounting module 304 may further include: a fastened position movement unit 3044. The opening closing unit 3043 is further used for controlling the battery swapping platform to move to a first locked position in a direction away from the lock tongue and then invoking the fastened position movement unit 3044, and the fastened position movement unit 3044 is used for controlling the battery swapping platform to move so as to move the lock shaft close to the opening to be at the locked position so that the lock shaft abuts against the lock tongue.

As shown in FIGS. 8 to 11, the locked position movement unit 3042 controls the squeezing of the elastic piece during the movement of the battery swapping platform. When the lock shaft reaches the first locked position, the lock tongue 602 drops to close the opening. After closing the opening, there is a certain movement space of the lock shaft 607 in the locking groove 601, so that a left-right movement may occur. In order to avoid the movement of the lock shaft 607 and fasten the battery pack, the battery swapping platform can be controlled via the fastened position movement unit 3044 to move in a direction opposite to the direction that the locked position movement unit 3042 controls to move until the lock shaft 607 abuts against the lock tongue 602, and at this time, the lock shaft 607 is squeezed and fixed in the locking groove 601 via the lock tongue 602 and the elastic piece 604.

Specifically, the fastened position movement unit 3044 may comprise a locked position movement sub-unit and a fastened position movement sub-unit. The locked position movement sub-unit may determine whether the lock shaft has reached the first locked position by collecting the first image of the locking mechanism, and the fastened position movement sub-unit may determine whether the lock shaft 607 has reached the fastened position by collecting a second image of the locking mechanism. A visual sensor is provided on the battery swapping device; the locked position movement sub-unit, in the process of controlling the battery swapping platform to move away from the lock tongue 602, acquires the first image comprising a locking mechanism by the visual sensor, and determines whether the lock shaft 607 is located at the first locked position according to a first standard image of the locking mechanism located at the first locked position; if so, the movement of the lock shaft is stopped; and if not, the movement of the lock shaft is continued and the collection of the first image comprising the locking mechanism is continued until the locking mechanism in the collected first image is located at the first locked position. If the locking mechanism image is not judged after the lock shaft 607 moves to the preset position, the control system will give a locking abnormality alarm with graphical and audible prompts. For example, any edge of the lock base in the locking mechanism may be set as a reference edge, and there may be a reference position of the reference edge in the first standard image; if the position of the reference edge in the acquired first image coincides with the reference position of the reference edge in the first standard image, it may indicate that the lock shaft is located at the first locked position, and if they do not coincide, it may indicate that the lock shaft is not located at the first locked position; it should be understood that the above-mentioned setting any edge of the lock base as a reference edge is merely an example to facilitate the description of the present embodiment, and in practice, any point, any side, or any part of the locking mechanism can be used as a reference position to determine whether the lock shaft is in the first locked position.

By the same reasoning, the fastened position movement sub-unit, in the process of controlling the movement of the battery swapping platform to move the lock shaft close to the opening, can acquire a second image comprising a locking mechanism via the visual sensor, and according to the second standard image of the locking mechanism located at the fastened position, judge whether the lock shaft is located at the fastened position, if so, the movement of the lock shaft is stopped, and if not, the movement of the lock shaft is continued and the acquisition of the second image comprising the locking mechanism is continued until the locking mechanism in the acquired second image is located at the fastened position.

In the present embodiment, the locking of the battery pack can be achieved by controlling the battery swapping platform to move away from the lock tongue, and after the battery pack is locked, the fastening of the battery pack can be achieved by controlling the battery swapping platform to move so as to move the lock shaft close to the opening.

After fastening the fully charged battery pack, the second safe height adjustment module 301 is used to adjust the height of the battery swapping platform to a fourth safe height threshold. The control system in the present embodiment may further comprise a second switch triggering module 311; the second safe height adjustment module 301 is also used for invoking the second switch triggering module 311 after adjusting the height of the battery swapping platform to the fourth safe height threshold; the second switch triggering module 311 is used for triggering an in-place switch to stop the descending of the battery swapping platform; then the second telescopic length control module 309 controls the battery swapping device to move along the length direction of the electric car to a fifth safe telescopic position; the second movement control module 302 controls the battery swapping device to move out from the bottom of the electric car.

The second safe height adjustment module 301 can adjust the height of the battery swapping platform according to the overall height of the battery swapping device, and the fourth safe height threshold is lower than the height from the lowest part of the chassis of the electric car to the driving plane of the battery swapping device so as to avoid the bottom of the electric car when the battery swapping device moves to be below the electric car. The detailed adjustment mode of the second safe height adjustment module 301 may refer to the description of the height adjustment in the first safe height adjustment module 201 of embodiment 3, and will not be described in detail herein.

The specific manner in which the second telescopic length control module 309 controls the movement of the battery swapping device to the fifth safe telescopic position can be referred to the manner in which the first telescopic length control module 210 controls the movement of the battery swapping device to the first safe telescopic position in embodiment 3, and this will not be repeated herein.

By triggering the in-place switch by the second switch triggering module 311, after the battery swapping platform descends to the fourth safe height threshold, the continuous descent of the battery swapping platform can be avoided, so that the descent time of the battery swapping platform can be reduced, and the overall efficiency of the battery swapping process is improved.

At this point, a series of operations of mounting the battery pack for the electric car have been completed.

According to the battery swapping control system of the present embodiment, on the one hand, in the process of the battery swapping device removing and mounting a battery pack, by adjusting the height of the battery swapping platform, it avoids the scenario that the battery swapping device collides with the electric car in the process of entering and exiting from the bottom of the electric car; on the other hand, by the pre-pushing process, the efficiency of removing the battery pack can be improved, and by controlling the movement of the lock shaft from the locked position to the fastened position, the fixing of the battery pack is realized, thereby improving the efficiency and effectiveness of mounting the battery pack. Therefore, overall, the battery swapping time of the electric car is saved and the battery swapping efficiency is improved, and the cooperative control between the battery swapping device and the battery pack transfer apparatus is realized, so that the transfer time of the battery pack from the battery swapping device to the electric car and the transfer time of the battery pack from the battery transfer apparatus to the battery swapping device is saved, and the transfer efficiency of the battery pack is improved.

Embodiment 5

An embodiment of the present invention also provides an electronic device, which can be represented in the form of a computing device (which can be, for example, a server device), including a memory, a processor, and a computer program stored in the memory and operable on the processor. The processor, when executing the computer program, can implement the battery swapping control method in embodiment 1 or embodiment 2 of the present invention.

Figure 23:
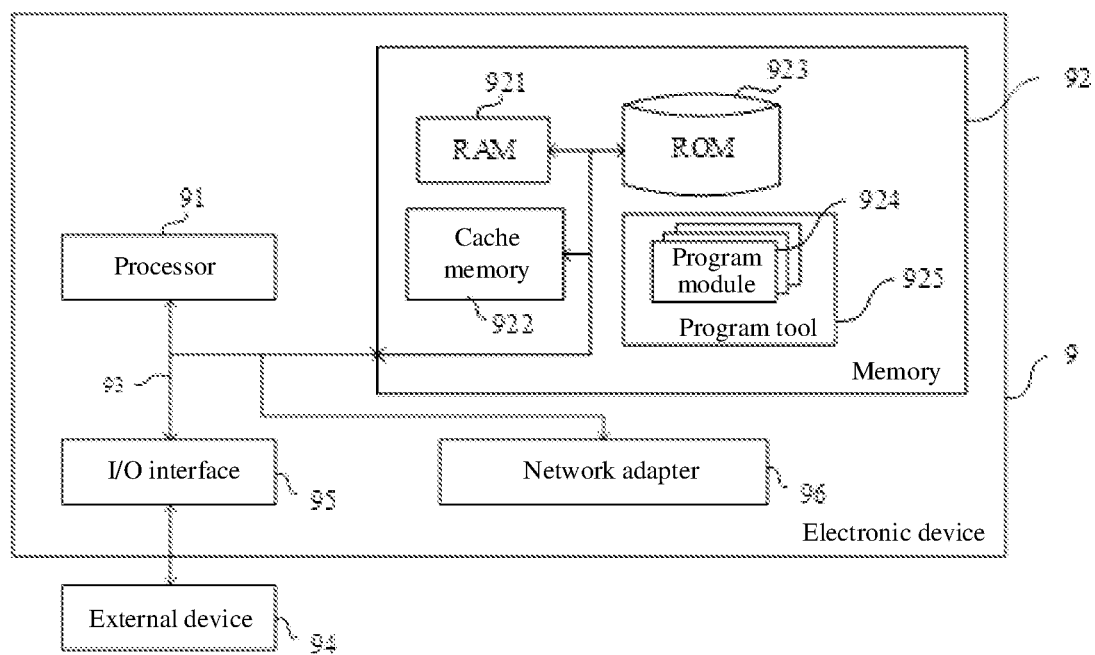
FIG. 23 is a schematic diagram of modules of an electronic device in embodiment 5.

FIG. 23 shows a schematic hardware structure diagram of the present embodiment. As shown in FIG. 23, an electronic device 9 specifically includes:

at least one processor 91, at least one memory 92, and a bus 93 for connecting different system assemblies, (including the processor 91 and the memory 92), wherein:

the bus 93 includes a data bus, an address bus, and a control bus.

The memory 92 includes volatile memory, such as random access memory (RAM) 921 and/or cache memory 922, and may further include read-only memory (ROM) 923.

The memory 92 also includes a program/utility 925 having one set (at least one) of program modules 924. Such program module 924 includes, but is not limited to: an operating system, one or more application programs, other program modules, and program data. Each of these examples, or some combination thereof, may include an implementation of a network environment.

The processor 91 executes various functional applications and data processing by running a computer program stored in the memory 92, such as the battery swapping control method in embodiment 1 or embodiment 2 of the present invention.

The electronic device 9 may further communicate with one or more external devices 94 (e.g. keyboards, pointing devices, etc.). Such communication may occur via an input/output (I/O) interface 95. Moreover, the electronic device 9 may further communicate with one or more networks (e.g. a local area network (LAN), a wide area network (WAN), and/or a public network, such as the Internet) via a network adapter 96. The network adapter 96 communicates with other modules of the electronic device 9 over the bus 93. It should be understood that although not shown in the figures, other hardware and/or software modules may be used in conjunction with the electronic device 9, including but not limited to: microcode, device drivers, redundant processors, external disk drive arrays, RAID (redundant array of independent disks) systems, tape drives, data backup storage systems, etc.

It should be noted that while several units/modules or sub-units/modules of an electronic device have been mentioned above in the detailed description, such division is merely exemplary and not mandatory. In fact, according to the implementation mode of the present application, the features and functions of two or more units/modules described above can be embodied in one unit/module. Conversely, the features and functions of one unit/module described above may be further divided into embodiments by multiple units/modules.

Embodiment 6

An embodiment of the present invention also provides a computer-readable storage medium on which a computer program is stored. The program, when executed by the processor, implements the steps of the battery swapping control method in embodiment 1 or embodiment 2 of the present invention.

The readable storage medium may use, more specifically, and can include but is not limited to: a portable disk, a hard disk, a random access memory, a read-only memory, an erasable programmable read-only memory, an optical storage device, a magnetic storage device, or any suitable combination of the above.

In a possible implementation mode, the present invention can also be implemented in the form of a program product, which includes a program code used to cause the terminal device to execute the steps implementing the battery swapping control method in embodiment 1 or embodiment 2 of the present invention when the program product is running on the terminal device.

A program code for executing the present invention can be written in any combination of one or more programming languages, and the program code can be completely executed on a user device, partially executed on a user device, executed as a standalone software package, partially executed on a user device and partially executed on a remote device, or completely executed on a remote device.

While particular implementation modes of the present invention have been described above, it should be understood by those skilled in the art that this has been done by way of example only, and the scope of the invention is to be judged by the appended claims. Technicians in the art may make various changes or modifications to these implementation modes without departing from the principles and essence of the present invention, and these changes and modifications fall within the scope of protection of the present invention.

Although particular implementation modes of the present invention are described above, those skilled in the art should understand that these are only examples and that multiple changes or modifications can be made to these implementation modes without departing from the principles and essence of the present invention. Therefore, the scope of protection of the present invention is limited by the appended claims.

What is claimed is:

1. A battery swapping control method, characterized in that the battery swapping control method is applied to a battery swapping device removing a battery pack from a bottom of an electric car, the battery swapping device having a liftable battery swapping platform, and the battery swapping control method comprising:

controlling the battery swapping device to move to a preset battery swapping position beneath the electric car;

controlling the battery swapping platform to rise to a preset removal height; and controlling the battery swapping device to remove the battery pack from the bottom of the electric car;

the battery swapping platform comprises an insertion piece, the battery pack is mounted to a battery bracket, a preset receiving position is provided on the battery bracket, and after a step of controlling the battery swapping device to move to a preset battery swapping position beneath the electric car, the method further comprises:

adjusting a position of the battery swapping platform along a length direction of the electric car to move the insertion piece to a preset insertion position, the preset insertion position being aligned with the preset receiving position;

a receiving piece is provided above the preset receiving position;

the step of controlling the battery swapping platform to rise to a preset removal height comprises:

controlling the battery swapping platform to rise at a first speed to a first removal height, wherein when the battery swapping platform is located at the first removal height, the insertion piece is in contact with the receiving piece;

and controlling the battery swapping platform to rise to a preset removal height at a second speed, wherein when the battery swapping platform is located at the preset removal height, the insertion piece is inserted into the receiving piece and is fitted to the receiving piece;
wherein the first speed is greater than the second speed.

2. The battery swapping control method according to claim 1, characterized by further comprising, before a step of controlling the battery swapping device to move to a preset battery swapping position beneath the electric car:
controlling the battery swapping device to move to a first safe telescopic position along a width direction of the electric car so that wheels are located within a preset parking range of a battery swapping site when the electric car moves to the battery swapping site.

3. The battery swapping control method according to claim 1, characterized by further comprising, before a step of controlling the battery swapping device to move to a preset battery swapping position beneath the electric car:
controlling the battery swapping device to move to a second safe telescopic position along a length direction of the electric car so as to avoid front wheels and rear wheels of the electric car when the battery swapping device located at the second safe telescopic position enters the preset battery swapping position along a width direction of the electric car.

4. The battery swapping control method according to claim 1, characterized in that a battery bracket comprises a locking mechanism, the locking mechanism comprises a lock tongue, a locking groove, and an unlocking point, the battery pack comprises a lock shaft, and when the battery pack is locked, the lock shaft enters the locking groove through an opening of the locking groove and the lock shaft is fastened in the locking groove through the lock tongue;
a step of controlling the battery swapping device to remove the battery pack from the bottom of the electric car comprises:
controlling the battery swapping platform to move such that the lock shaft of the battery pack moves away from the lock tongue to an unlocking pre-pushing position;
an unlocking jacking pin of the battery swapping device jacking up the unlocking point to drive the lock tongue away from the locking groove; and
controlling the battery swapping platform to move such that the lock shaft of the battery pack moves toward an opening of the locking groove to an unlocked position to separate the battery pack from the battery bracket and drop a same into the battery swapping device.

5. The battery swapping control method according to claim 1, characterized in that the battery swapping control method further comprises:
acquiring an identifier of the electric car after the electric car enters a battery swapping station;
matching a model of the electric car according to the identifier; and
matching a corresponding battery swapping parameter according to the model of the electric car, wherein the battery swapping parameter comprises at least one of the first safe height threshold, the second safe height threshold, the first safe telescopic position, the second safe telescopic position, and the third safe telescopic position.

6. The battery swapping control method according to claim 1, characterized by further comprising, before a step of controlling the battery swapping device to move to a preset battery swapping position beneath the electric car;
adjusting a height of the battery swapping platform to a first safe height threshold, the first safe height threshold being lower than the height from a lowest part of a chassis of the electric car to a driving plane of the battery swapping device.

7. The battery swapping control method according to claim 6, characterized in that the battery swapping platform is provided with a distance measuring apparatus, and the battery swapping control method further comprises:
acquiring a current height of the battery swapping platform through the distance measuring apparatus; and
judging whether the current height is within a first range of the first safe height threshold, and if not, executing the step of adjusting the height of the battery swapping platform to the first safe height threshold.

8. The battery swapping control method according to claim 1, characterized in that the battery swapping device comprises an unlocking jacking pin, the battery pack is mounted to a battery bracket, and the battery bracket comprises a locking mechanism on which an unlocking point is provided;
wherein after a step of controlling the battery swapping device to move to a preset battery swapping position beneath the electric car, the method further comprises:
adjusting a position of the unlocking jacking pin to align the unlocking jacking pin with the unlocking point.

9. The battery swapping control method according to claim 8, characterized in that the battery swapping device is provided with an unlocked position and an in situ position, wherein when the unlocking jacking pin is located at the unlocked position, the unlocking jacking pin is aligned with the unlocking point, and when the unlocking jacking pin is located at the in situ position, the unlocking jacking pin avoids the unlocking point;
the step of adjusting a position of the unlocking jacking pin comprises:
moving the unlocking jacking pin, and judging whether the unlocking jacking pin is located at the unlocked position, if not, continuing to move the unlocking jacking pin, and if so, stopping moving the unlocking jacking pin.

10. The battery swapping control method according to claim 9, characterized in that a detection sensor is provided on the battery swapping device, a detection point is provided on the unlocking jacking pin, or the detection point is provided on the battery swapping device, and the detection sensor is provided on the unlocking jacking pin;
the step of judging whether the unlocking jacking pin is located at the unlocked position comprises:
when the detection point is located in a detection area of the detection sensor, determining that the unlocking jacking pin is located at the unlocked position.

11. The battery swapping control method according to claim 1, characterized by further comprising, after a step of controlling the battery swapping device to remove the battery pack from the bottom of the electric car:
adjusting a height of the battery swapping platform to a second safe height threshold, wherein a sum of the second safe height threshold and the height of the battery pack is lower than the height from a lowest part of a chassis of the electric car to a driving plane of the battery swapping device.

12. The battery swapping control method according to claim 11, characterized in that the battery swapping platform comprises a lifting mechanism, an in-place switch is provided on the lifting mechanism, and the battery swapping control method further comprises:
triggering the in-place switch to stop a descending of the battery swapping platform after the height of the battery swapping platform lowers to the second safe height threshold.

13. The battery swapping control method according to claim 11, characterized by further comprising, after the step of adjusting a height of the battery swapping platform to a second safe height threshold:
controlling the battery swapping device to move to a third safe telescopic position along a length direction of the electric car so as to avoid front wheels and rear wheels of the electric car when the battery swapping device moves out from below the electric car along a width direction of the electric car.

14. The battery swapping control method according to claim 11, characterized by further comprising, after the step of adjusting a height of the battery swapping platform to a second safe height threshold:
adjusting an unlocking jacking pin of the battery swapping device to an in situ position.

15. A battery swapping control method, characterized in that the battery swapping control method is applied to a battery swapping device mounting a battery pack in a battery bracket of an electric car, wherein the battery swapping device has a liftable battery swapping platform, the battery pack to be mounted to the battery bracket of the electric car is placed on the battery swapping device, and the battery swapping control method comprises:
controlling the battery swapping device to move to a preset battery swapping position beneath the electric car;
controlling the battery swapping platform to rise to a preset mounting height; and
controlling the battery swapping device to mount the battery pack to the battery bracket of the electric car;
the battery swapping platform comprises an insertion piece, and a receiving piece is provided above a preset receiving position:
a step of controlling the battery swapping platform to rise to a preset mounting height comprises:
controlling the battery swapping platform to rise at a first speed to a first mounting height, wherein the insertion piece is in contact with the battery bracket when the battery swapping platform is located at the first mounting height, and
controlling the battery swapping platform to rise to the preset mounting height at a second speed, wherein when the battery swapping platform is located at the preset mounting height, the insertion piece is inserted into the receiving piece and is fitted to the receiving piece;
wherein the first speed is greater than the second speed.

16. The battery swapping control method according to claim 15, characterized by further comprising, before a step of controlling the battery swapping device to move to a preset battery swapping position beneath the electric car:
controlling the battery swapping device to move to a fourth safe telescopic position along a length direction of the electric so as to avoid front wheels and rear wheels of the electric car when the battery swapping device enters the preset battery swapping position along a width direction of the electric car.

17. The battery swapping control method according to claim 15, characterized by further comprising, after a step of controlling the battery swapping device to mount the battery pack to the battery bracket of the electric car:
adjusting a height of the battery swapping platform to a fourth safe height, wherein the fourth safe height is lower than the height from a lowest part of a chassis of the electric car to a driving plane of the battery swapping device.

18. The battery swapping control method according to claim 15, characterized in that the battery swapping control method further comprises:
acquiring an identifier of the electric car after the electric car enters a battery swapping station;
matching a model of the electric car according to the identifier; and
matching a corresponding battery swapping parameter according to the model of the electric car, wherein the battery swapping parameter comprises at least one of the third safe height threshold, the fourth safe height threshold, the fourth safe telescopic position, and the fifth safe telescopic position.

19. The battery swapping control method according to claim 15, characterized by further comprising, before a step of controlling the battery swapping device to move to a preset battery swapping position beneath the electric car:
adjusting a height of the battery swapping platform to a third safe height threshold, wherein a sum of the third safe height threshold and the height of the battery pack is lower than the height from a lowest part of a chassis of the electric car to a driving plane of the battery swapping device.

20. The battery swapping control method according to claim 19, characterized in that the battery swapping platform is provided with a distance measuring apparatus, and the battery swapping control method further comprises:
acquiring a current height of the battery swapping platform through the distance measuring apparatus; and
judging whether the current height is within a third range of the third safe height threshold, and if not, executing the step of adjusting the height of the battery swapping platform to the third safe height threshold.

21. The battery swapping control method according to claim 20, characterized by further comprising, before the step of controlling the battery swapping platform to rise to a preset mounting height:
adjusting a position of an unlocking jacking pin so that the unlocking jacking pin avoids an unlocking point on a locking mechanism.

22. The battery swapping control method according to claim 15, characterized in that the battery bracket comprises a locking mechanism, the locking mechanism comprises a locking groove provided with an opening facing the ground, the battery pack is provided thereon with a lock shaft, and the locking mechanism further comprises a lock tongue;
a step of controlling the battery swapping device to mount the battery pack to the battery bracket of the electric car comprises:
controlling the battery swapping platform to rise so that the lock shaft enters the opening and pushes open the lock tongue; and
controlling the battery swapping platform to move in a direction away from the lock tongue to a first locked position;
wherein the lock tongue drops to close the opening.

23. The battery swapping control method according to claim 22, characterized in that the step of controlling the battery swapping platform to move away from the lock tongue to the first locked position comprises:
in a process of controlling the battery swapping platform to move away from the lock tongue, collecting a first image comprising the locking mechanism, judging whether the lock shaft is located at the first locked position according to a first standard image of the locking mechanism located at the first locked position, and if so, stopping moving the lock shaft, and if not, continuing to move the lock shaft.

24. The battery swapping control method according to claim 22, characterized by further comprising, after the step of the lock tongue dropping to close the opening: controlling the battery swapping platform to move so as to move the lock shaft toward the opening to a fastened position such that the lock shaft abuts against the lock tongue.

25. The battery swapping control method according to claim 24, characterized in that the step of controlling the battery swapping platform to move so as to move the lock shaft toward the opening to a fastened position comprises:
in a process of controlling the battery swapping platform to move so as to move the lock shaft to the opening, collecting a second image comprising the locking mechanism, and judging whether the lock shaft is located at the fastened position according to a second standard image of the locking mechanism located at the fastened position, and if so, stopping moving the lock shaft, and if not, continuing to move the lock shaft.

26. A battery swapping control system, characterized in that the battery swapping control system is applied to a battery swapping device removing a battery pack from a bottom of an electric car, the battery swapping device has a liftable battery swapping platform, and the battery swapping control system comprises:
a movement control module,
a removal height control module, and
a battery removal module;
the movement control module is used for controlling the battery swapping device to move to a preset battery swapping position below the electric car;
the removal height control module is used for controlling the battery swapping platform to rise to a preset removal height;
the battery removal module is used for controlling the battery swapping device to remove the battery pack from the bottom of the electric car;
the battery swapping platform comprises an insertion piece,
the battery pack is mounted to a battery bracket,
a preset receiving position is provided on the battery bracket, and
the movement control module is configured for:
adjusting a position of the battery swapping platform along a length direction of the electric car to move the insertion piece to a preset insertion position,
the preset insertion position being aligned with the preset receiving position;
a receiving piece is provided above the preset receiving position;
the removal height control module is configured for:
controlling the battery swapping platform to rise at a first speed to a first removal height,
wherein when the battery swapping platform is located at the first removal height,
the insertion piece is in contact with the receiving piece; and
controlling the battery swapping platform to rise to a preset removal height at a second speed,
wherein when the battery swapping platform is located at the preset removal height,
the insertion piece is inserted into the receiving piece and is fitted to the receiving piece;
wherein the first speed is greater than the second speed.

27. A battery swapping control system, characterized in that the battery swapping control system is applied to a battery swapping device mounting a battery pack in a battery bracket of an electric car,
the battery swapping device has a liftable battery swapping platform,
the battery pack to be mounted to the battery bracket of the electric car is placed on the battery swapping device, and
the battery swapping control system comprises:
a movement control module,
a mounting height control module, and
a battery mounting module;
the movement control module is used for controlling the battery swapping device to move to a preset battery swapping position below the electric car;
the mounting height control module is used for controlling the battery swapping platform to rise to a preset mounting height;
the battery mounting module is used for controlling the battery swapping device to mount the battery pack on the battery bracket of the electric car;
the battery swapping platform comprises an insertion piece, and
a receiving piece is provided above a preset receiving position:
the mounting height control module is configured for:
controlling the battery swapping platform to rise at a first speed to a first mounting height,
wherein the insertion piece is in contact with the battery bracket when the battery swapping platform is located at the first mounting height, and
controlling the battery swapping platform to rise to the preset mounting height at a second speed,
wherein when the battery swapping platform is located at the preset mounting height,
the insertion piece is inserted into the receiving piece and is fitted to the receiving piece;
wherein the first speed is greater than the second speed.

28. An electronic device, comprising a memory, a processor, and a computer program stored in the memory and capable of running on the processor, the computer program being configured for executing steps in a battery swapping control method being applied to a battery swapping device for removing a battery pack from a bottom of an electric car, the battery swapping device having a liftable battery swapping platform and, the battery swapping control method comprising the steps:
controlling the battery swapping device to move to a preset battery swapping position beneath the electric car;
controlling the battery swapping platform to rise to a preset removal height; and
controlling the battery swapping device to remove the battery pack from the bottom of the electric car;
the battery swapping platform comprises an insertion piece, the battery pack is mounted to a battery bracket, a preset receiving position is provided on the battery bracket, and
after a step of controlling the battery swapping device to move to a preset battery swapping position beneath the electric car, the method further comprises;
adjusting a position of the battery swapping platform along a length direction of the electric car to move the insertion piece to a preset insertion position,
the preset insertion position being aligned with the preset receiving position;
a receiving piece is provided above the preset receiving position;
the step of controlling the battery swapping platform to rise to a preset removal height comprises:

controlling the battery swapping platform to rise at a first speed to a first removal height, wherein when the battery swapping platform is located at the first removal height, the insertion piece is in contact with the receiving piece; and controlling the battery swapping platform to rise to a preset removal height at a second speed, wherein when the battery swapping platform is located at the preset removal height, the insertion piece is inserted into the receiving piece and is fitted to the receiving piece;

wherein the first speed is greater than the second speed.

29. A computer-readable storage medium having stored thereon a computer program, when executed by a processor, the computer program implements a battery swapping control method being applied to a battery swapping device for removing a battery pack from a bottom of an electric car, the battery swapping device having a liftable battery swapping platform, and the battery swapping control method comprising the steps:

controlling the battery swapping device to move to a preset battery swapping position beneath the electric car;

controlling the battery swapping platform to rise to a preset removal height; and controlling the battery swapping device to remove the battery pack from the bottom of the electric car;

the battery swapping platform comprises an insertion piece, the battery pack is mounted to a battery bracket, a preset receiving position is provided on the battery bracket, and after a step of controlling the battery swapping device to move to a preset battery swapping position beneath the electric car, the method further comprises;

adjusting a position of the battery swapping platform along a length direction of the electric car to move the insertion piece to a preset insertion position, the preset insertion position being aligned with the preset receiving position;

a receiving piece is provided above the preset receiving position;

the step of controlling the battery swapping platform to rise to a preset removal height comprises:

controlling the battery swapping platform to rise at a first speed to a first removal height, wherein when the battery swapping platform is located at the first removal height, the insertion piece is in contact with the receiving piece; and controlling the battery swapping platform to rise to a preset removal height at a second speed, wherein when the battery swapping platform is located at the preset removal height, the insertion piece is inserted into the receiving piece and is fitted to the receiving piece;

wherein the first speed is greater than the second speed.

* * * * *